United States Patent
Chickermane et al.

(10) Patent No.: US 11,256,839 B1
(45) Date of Patent: Feb. 22, 2022

(54) IP BLOCK SCAN CHAIN CONSTRUCTION

(71) Applicant: Cadence Design Systems, Inc., San Jose, CA (US)

(72) Inventors: Vivek Chickermane, Slaterville Springs, NY (US); Subhasish Mukherjee, Noida (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/228,282

(22) Filed: Apr. 12, 2021

(51) Int. Cl.
  *G06F 30/333* (2020.01)
  *G06F 30/347* (2020.01)
  *G06F 30/343* (2020.01)

(52) U.S. Cl.
  CPC .......... *G06F 30/333* (2020.01); *G06F 30/343* (2020.01); *G06F 30/347* (2020.01)

(58) Field of Classification Search
  CPC ..... G06F 30/333; G06F 30/343; G06F 30/347
  USPC ....... 716/105, 106, 121, 122, 123, 124, 131, 716/136; 703/14, 15, 16
  See application file for complete search history.

(56) References Cited

U.S. PATENT DOCUMENTS

| | | | |
|---|---|---|---|
| 6,681,356 B1 * | 1/2004 | Gerowitz | G01R 31/318536 714/729 |
| 6,694,464 B1 * | 2/2004 | Quayle | G01R 31/31717 714/725 |
| 7,607,057 B2 | 10/2009 | Boike et al. | |
| 7,757,198 B1 | 7/2010 | Zhao et al. | |
| 7,904,857 B2 | 3/2011 | Wang et al. | |
| 7,996,805 B2 | 8/2011 | Pasqualini | |
| 8,738,978 B2 | 5/2014 | Tekumalla et al. | |
| 9,043,665 B2 * | 5/2015 | Patil | G01R 31/318561 714/734 |
| 2009/0288045 A1 * | 11/2009 | Chien | G06F 30/327 716/103 |
| 2012/0233514 A1 * | 9/2012 | Patil | G01R 31/318561 714/734 |

(Continued)

OTHER PUBLICATIONS

Bonhomme, Y., Efficient Scan Chain Design for Power Minimization During Scan Testing Under Routing Constraint pp. 488-493, 2003, IEEE.

(Continued)

*Primary Examiner* — Phallaka Kik
(74) *Attorney, Agent, or Firm* — Tarolli, Sundheim, Covell & Tummino LLP

(57) ABSTRACT

A scan chain engine can determine a set number of EXTEST scan chains for the IP block and based on a predetermined maximum number of EXTEST wrapper cells per EXTEST scan chain. The scan chain engine iteratively executes partitioning on the IP block to generate a set of partitions. Each partition in the set of partitions has a number of EXTEST wrapper cells that does not exceed the maximum number of EXTEST wrapper cells per EXTEST scan chain. The scan chain engine selectively merges partitions of the set of partitions to form a set of populated partitions that each include an EXTEST wrapper cell. The number of partitions is equal to the set number of EXTEST scan chains for the IP block. The scan chain engine generates wire paths connecting EXTEST wrapper cells of each populated partition to construct the set number of EXTEST scan chains for the IP block.

20 Claims, 15 Drawing Sheets

(56) References Cited

U.S. PATENT DOCUMENTS

2013/0086544 A1* 4/2013 Alpert .................. G06F 30/394
716/129

OTHER PUBLICATIONS

Divakar, D., et al.. Power Domain, Physical Aware Scan Chain Allocation and Reordering pp. 1-5, Indian Journal of Science and Technology vol. 9(37) Oct. 2016.

* cited by examiner

IP BLOCK SCAN CHAIN CONSTRUCTION

TECHNICAL FIELD

This disclosure relates to a scan chain construction in an intellectual property (IP) block for an integrated circuit (IC) chip.

BACKGROUND

Electronic design automation (EDA), also referred to as electronic computer-aided design (ECAD), is a category of software tools for designing electronic systems such as IC chips and printed circuit boards. The tools work together in a design flow that IC chip designers use to design and analyze entire semiconductor chips. Since a modern semiconductor chip can have billions of components, EDA tools are essential for the design of IC chips.

Design for testing or design for testability (DFT) includes of IC chip design techniques that add testability features to a hardware product design. The added features enable efficient development and application of manufacturing tests to the designed hardware. The purpose of manufacturing tests is to validate that the product hardware contains no manufacturing defects that could adversely affect the product's correct functioning.

In electronic design, a semiconductor IP block (alternatively referred to as an IP core) is a reusable unit of logic, cell, or integrated circuit layout design that is the intellectual property of one party. IP blocks can be licensed to another party or owned and used by a single party. The term comes from the licensing of the patent or source code copyright that exists in the design. Designers of application-specific integrated circuits (ASIC) and systems of field-programmable gate array (FPGA) logic can use IP blocks as building blocks.

SUMMARY

One example relates to a non-transitory machine-readable medium having machine-readable instructions, the machine-readable instructions includes a scan chain engine that selects an IP block for an integrated circuit IC design. The scan chain engine can determine a set number of EXTEST scan chains for the IP block based on a predetermined maximum number of EXTEST wrapper cells per EXTEST scan chain. The scan chain engine iteratively executes partitioning on the IP block to generate a set of partitions, wherein each partition in the set of partitions has a number of EXTEST wrapper cells that does not exceed the maximum number of EXTEST wrapper cells per EXTEST scan chain. The scan chain engine selectively merges partitions of the set of partitions to form a set of populated partitions that each include an EXTEST wrapper cell. The number of populated partitions is equal to the set number of EXTEST scan chains for the IP block. The scan chain engine can generate wire paths connecting EXTEST wrapper cells of each populated partition of the set of populated partitions to construct the set number of EXTEST scan chains for the IP block.

Another example relates to a system that incudes a non-transitory memory that stores machine-readable instructions and a processing unit that accesses the memory and executes the machine-readable instructions, the machine-readable instructions comprising an EDA application. The EDA application can include a graphical user interface (GUI) that generates scan chain parameters for an IP block in response to user input. The EDA application can also include a scan chain engine that selects an IP block for an IC design. The scan chain engine can select a set number of EXTEST scan chains for the IP block based on a predetermined maximum number of EXTEST wrapper cells per EXTEST scan chain specified in the scan chain parameters or on a predetermined set number of EXTEST scan chains specified in the scan chain parameters. The scan chain engine can still further iteratively execute partitioning on the IP block to generate a set of partitions. Each partition in the set of partitions has a number of EXTEST wrapper cells that does not exceed the maximum number of EXTEST wrapper cells per EXTEST scan chain. The scan chain engine can selectively merge partitions of the set of partitions to form a set of populated partitions that each include an EXTEST wrapper cell, wherein the number of populated partitions is equal to the set number of EXTEST scan chains for the IP block. The scan chain engine can also generate wire paths connecting EXTEST wrapper cells of each populated partition of the set of populated partitions to construct the set number of EXTEST scan chains for the IP block that comply with the scan chain parameters. The GUI can output a visual representation of the IP block with the set number of EXTEST scan chains.

Yet another example relates to a method for constructing physically aware EXTEST scan chains in an IP block for an IC chip. The method can include determining, by a scan chain engine, a set number of EXTEST scan chains for the IP block based on a predetermined maximum number of EXTEST wrapper cells per EXTEST scan chain. The method can further include iteratively executing, by the scan chain engine, partitioning on the IP block to generate a set of partitions, wherein each partition in the set of partitions has a number of EXTEST wrapper cells that does not exceed the maximum number of EXTEST wrapper cells per EXTEST scan chain. The method can include selectively merging, by the scan chain engine, partitions of the set of partitions to form a set of populated partitions that each include an EXTEST wrapper cell, wherein the number of populated partitions is equal to the set number of EXTEST scan chains for the IP block. The method can also include generating, by the scan chain engine, wire paths connecting EXTEST wrapper cells of each populated partition of the set of populated partitions to construct the set number of EXTEST scan chains for the IP block.

DETAILED DESCRIPTION

Figure 1:
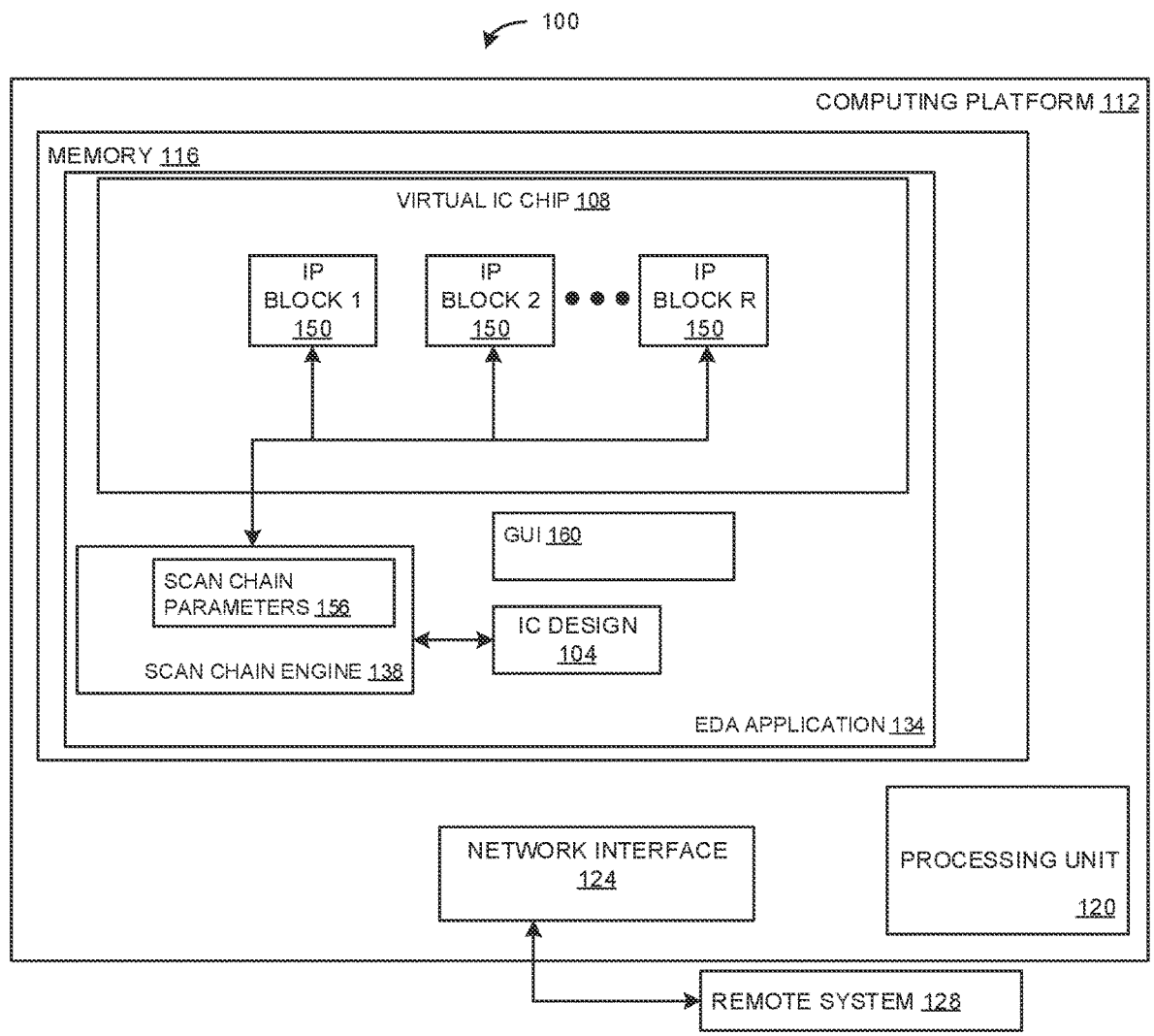
FIG. 1 illustrates an example of a system for constructing scan chains in IP bocks of an IC chip.

This disclosure relates to systems and methods for systematically constructing physically aware EXTEST scan chains in an IP block (or multiple IP blocks) for an IC chip. Each scan chain of an IP block can be categorized as either an internal scan chain (referred to as an INTEST scan chain) or as an external scan chain (referred to as an EXTEST scan chain). INTEST scan chains interact with internal components of the IP block. In contrast, EXTEST scan chains have at least one port that is accessible from an input/output (I/O) port of the IP block. Stated differently, an EXTEST scan chain is accessible to components external to the IP block that contains the EXTEST scan chain. The system can include a GUI that generates scan chain parameters for the IP block in response to user input. In various examples, the scan chain parameters can include, but are not limited to a set number of scan chains to generate for the IP block, a predetermined maximum number of EXTEST wrapper cells per scan chain and/or a maximum length of a longest wire for each EXTEST scan chain.

EXTEST scan chains are defined by the Joint Action Test Group (JTAG), which set forth standards for verifying and testing circuits. These standard are further defined in the Institute for Electrical and Electronics Engineers (IEEE) standard 1149.1. The IEEE standard 1149.1 defines an EXTEST instruction that is employable to perform interconnect testing through an EXTEST scan chain. More particularly, when the EXTEST instruction is executed on an IP block being tested, a boundary scan register is connected between test data in (TDI) and test data out (TDO) and the IP block under test is placed in an "external" test mode. In this mode, boundary-scan output cells will drive test data onto ports of the IP block and input cells will capture data from ports of the IP block.

The system also includes a scan chain engine that selects the IP block from a plurality of IP blocks for an IC design of the IC chip. In some examples, the scan chain engine can determine the set number of EXTEST scan chains given the maximum number of EXTEST wrapper cells per EXTEST scan chain specified in the scan chain parameters. In other examples, the scan chain engine can determine the maximum number of EXTEST wrapper cells per EXTEST scan chain based on a predetermined number of EXTEST scan chains defined in the scan chain parameters that defined the set number of EXTEST scan chains. The scan chain engine is configured/programmed to curtail long hops between two consecutive EXTEST wrapper cells in a chain and also curtails crossings between two EXTEST scan chains. More particularly, the scan chain engine can execute a physically aware scan chain construction process that includes iteratively executing partitioning (such as quad partitioning or another type of partitioning, such as binary partitioning) on the IP block to generate a set of partitions. The scan chain engine is configured such that each partition in the set of partitions has a number of EXTEST wrapper cells that does not exceed the maximum number of EXTEST wrapper cells per EXTEST scan chain. The physically aware scan chain construction process can include selectively merging partitions of the set of partitions to form a set of populated partitions that each include an EXTEST wrapper cell, such that the number of partitions is equal to the set number of EXTEST scan chains for the IP block. Moreover, the physically aware scan chain construction process can reorder the EXTEST wrapper cells and generate wire paths connecting EXTEST wrapper cells of each populated partition of the set of populated partitions to construct the set number of EXTEST scan chains for the IP block that comply with the scan chain parameters.

The GUI can output a visual representation of the IP block with the set number of EXTEST scan chains. An IC chip designer can employ the visual representation to determine if adjustment to the scan chain parameters is needed. If the scan chain parameters are adjusted (updated), the scan chain engine can re-execute the physically aware scan chain construction process based on the adjusted scan chain parameters. In this manner, the scan chain parameters can be tuned until a satisfactory set of scan chains has been generated.

FIG. 1 illustrates an example of a system 100 for constructing scan chains for an IC design 104 that could be represented as a virtual IC chip 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124 and the memory 116 could be representative of a single instance of hardware or multiple instances of hardware with applications executing across the multiple of instances (i.e., distributed) of hardware (e.g., computers, routers, memory, processors or a combination thereof). Alternatively, the computing platform 112 could be implemented on a single dedicated server or workstation.

The IC design 104 can be stored in the memory 116 of the computing platform 112. The IC design 104 can be implemented, for example, as design specifications for an IC chip. The IC design 104 can be generated with an EDA application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 104. In the examples described, the virtual IC chip 108 represents a simulated instantiation of the IC design 104.

The memory 116 can include an EDA application 134. The EDA application 134 can be, for example a design for test (DFT) EDA application. The EDA application 134 analyzes the IC design 104 to provide the virtual IC chip 108. The EDA application 134 can include a scan chain engine 138 that is configured to construct physically aware EXTEST scan chains in the virtual IC chip 108 that can be stored in the IC design 104, such that the IC design 104 can be fabricated.

More particularly, the virtual IC chip 108 can include R number of IP blocks 150, where R is an integer greater than or equal to one. While FIG. 1 illustrates three IP blocks 150, in many instances, there can be virtually any number of IP blocks (e.g., hundreds, thousands or millions). The IP blocks 150 can represent a logic block that executes a particular function. Each IP block 150 or some subset thereof can be provided for example, by a third-party developer or could be designed by the end-user that generated the IC design 104. In some examples, internal operations of some (or all) of the IP blocks 150 are known to the end-user. In other examples, such internal operations some (or all) of the IP blocks 150 are obfuscated. Each IP block 150 can include features for construction of EXTEST scan chains. The features can be, for example, scan flip-flops that can apply tests patterns to components of each respective IP block 150.

Figure 2:
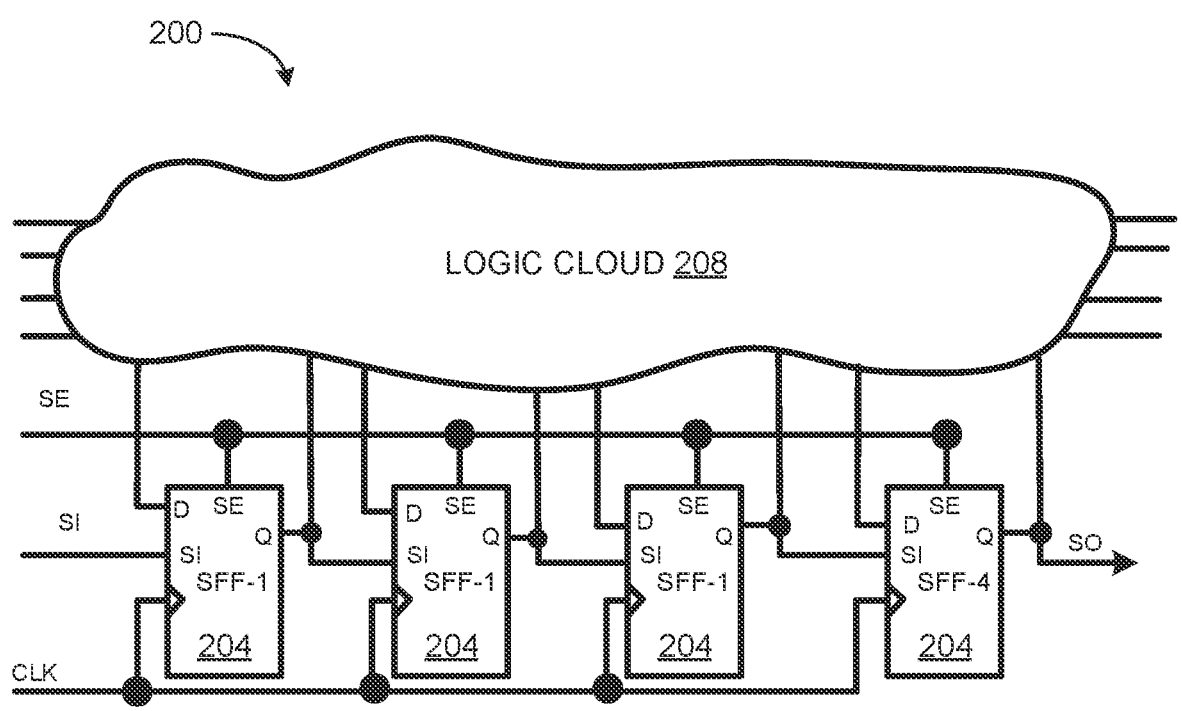
FIG. 2 illustrates a diagram of a scan chain.

FIG. 2 illustrates a simplified example of a scan chain 200 that can be implemented with four scan flip flops 204 labeled SFF-1 . . . SFF-4. In other examples of EXTEST scan chains there could be more or less scan flip flops 204. Each scan flip-flop 204 is implemented with a D flip-flop with a multiplexer added at an input with one input of the multiplexer acting as the functional input port D, and the other input serving as the Scan-In (SI) input port. The D input port is coupled to a logic cloud 208 that can be representative of sequential and/or combinational logic within an IP block (e.g., an IP block 150 of FIG. 1). Each scan flip flop 204 also includes an Scan Enable (SE) port (alternatively referred to as a test enable (TE) port) that is employable to control the multiplexer selection bit. Each scan flip flop 204 also includes a clock input port that receives a clock signal, CLK. The scan chain 200 is formed by coupling each of the scan flip flops 204 together in series. Thus, an output of the first through then penultimate scan flip flops 204 (e.g., SSF-1 . . . SFF-3) is coupled to the SI port of a next scan flip flop 204. Wrapper cells (not shown) can be coupled to the scan chain 200. Such wrapper cells can be coupled to the first scan flip flop 204 and the last scan flip flop 204. Wrapper cells provide an interface for external components to interact with the scan chain 200.

A scan enable signal, SE is applied to the SE port of each scan flip flop 204, and a scan input signal, SI is applied to the SI port of the first scan flip flop 204 (SFF-1). Moreover, an output of the last scan flip flop 204 (SSF-4) can provide a scan out signal, SO for the scan chain 200. The scan chain 200 is configured such that when the scan in signal, SI is asserted (e.g., high voltage), the scan chain operates in test (shift) mode. In test mode the inputs from the SI inputs are shifted through the scan chain 200, and scan chain states can be shifted out through the scan chain 200 and as the SO signal (provided at the output of the last scan flip flop 204) of the scan chain to implement a test. During the test, a test program compares the SO values with expected values to verify the performance of an IC chip, such as a IC chip implementing the IC design 104 of FIG. 1.

Referring back to FIG. 1, each scan chain of each IP block 150 can be categorized as either an internal scan chain (referred to as an INTEST scan chain) or as an External scan chain (referred to as an EXTEST scan chain). INTEST scan chains interact with internal components of a respective IP block 150. Conversely, EXTEST scan chains have at least one port that is accessible from an I/O port of a respective IP block 150. Stated differently, an EXTEST scan chain is accessible to components external to the IP block 150 that contains the EXTEST scan chain. Moreover, an EXTEST scan chain is the first or last register of an I/O port of a respective IP block. That is, only combinational logic is permitted between an I/O port and an EXTEST scan chain.

Each EXTEST scan chain of each IP block 150 can include an EXTEST wrapper cell. As used herein, an EXTEST wrapper cell refers to a circuit component, or a plurality of circuit components that are designed to launch or capture a test pattern into a respective EXTEST scan chain. Thus, each EXTEST wrapper cell can provide a port of ingress or egress of a respective scan chain. In some examples, EXTEST wrapper cells can be implemented as D flip-flops. EXTEST wrapper cells for EXTEST scan chains can be distributed about an IP block 150 in a multimodal manner. That is, some regions of an IP block 150 can have wrapper cells for EXTEST scan chains that are tightly clustered, and some areas may be sparsely populated.

Figure 3:
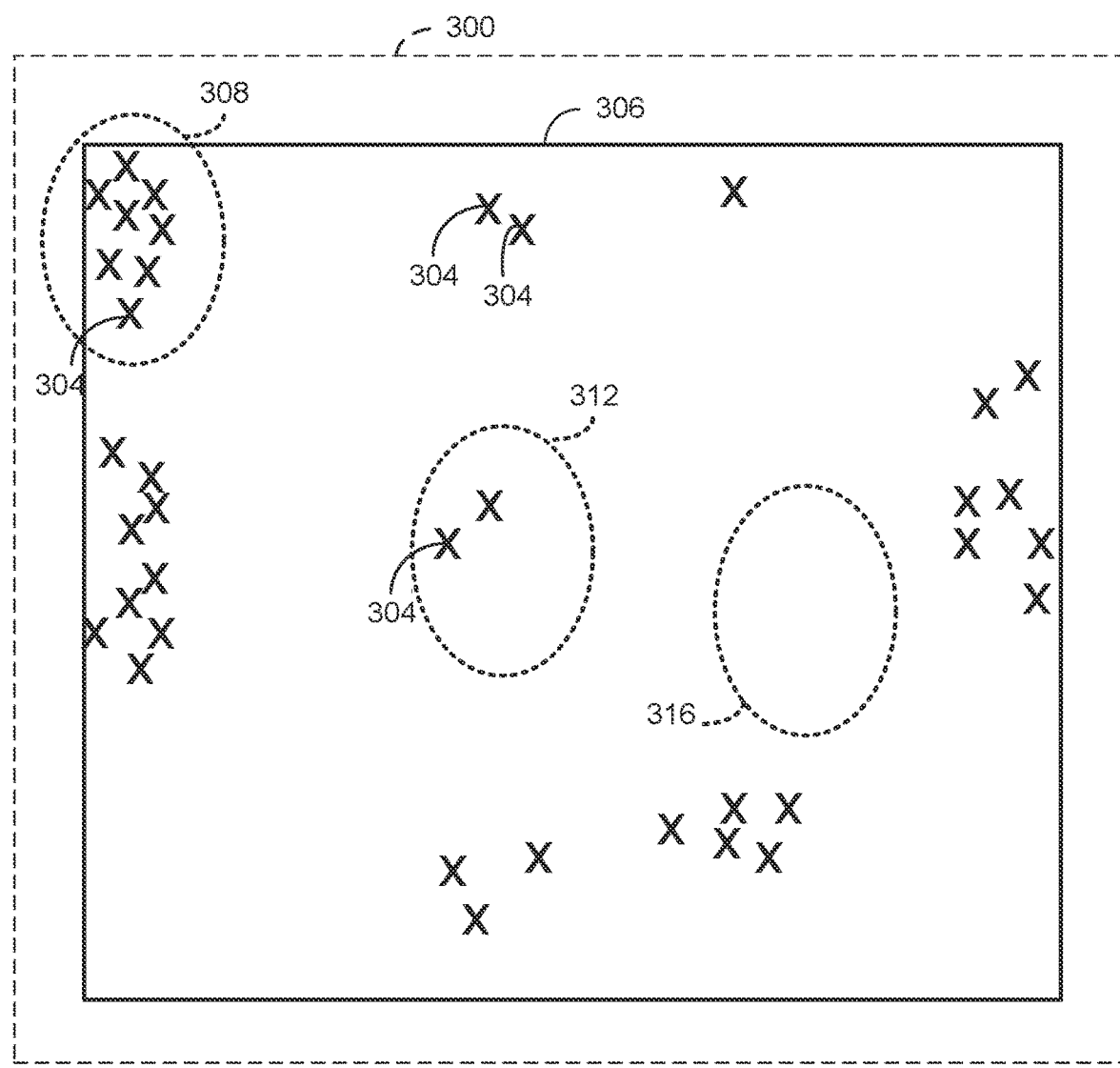
FIG. 3 illustrates a diagram of an IP block with EXTEST wrapper cells scattered throughout.

FIG. 3 illustrates an example of an IP block 300 with markers for EXTEST wrapper cells 304 (only some of which are labeled) corresponding to locations of EXTEST scan chains. That is, each EXTEST wrapper cells 304 represents an egress or ingress port for a respective EXTEST scan chain. The IP block 300 includes a boundary 306 that defines physical dimensions (length and width) of the IP block 300. The EXTEST wrapper cells 304 of the IP block 300 are distributed in a multimodal distribution manner, wherein the EXTEST wrapper cells 304 are highly scattered and concentrated around the boundary 306. More particularly, various regions have different numbers of EXTEST wrapper cells 304. For instance, a first region 308 includes seven clustered EXTEST wrapper cells 304, a second region 312 includes two EXTEST wrapper cells 304, and a third region 316 does not have any EXTEST wrapper cells 304. The EXTEST wrapper cells 304 can be coupled together to form a scan chain that includes shorter scan chains (each gated by a corresponding wrapper cell). Thus, in an example where the EXTEST wrapper cells 304 were coupled together to form a single scan chain, there would be a relatively long wire between certain wrapper cells. For instance, if the IP block 300 as a width and a length of about 4000 units, some wires connecting could meet or exceed the total width or length of the IP block 150. The units of measurement (e.g., the 4000 "units") used herein can be any unit of measurement suitable for IC chip design. As one example, the units of measurement could be in nanometers (nm). In other examples, the units of measurement could be in micrometers (μm) or picometers (μm).

Referring back to FIG. 1, to avoid excessively long wire lengths, the scan chain engine 138 can modify the virtual IC chip 108 to set orders of EXTEST scan chains based on scan chain parameters 156. The scan chain parameters 156 can be set in response to user input. For example, in some situations, the EDA application 134 can provide a GUI 160 that allows entry of text and/or manipulation of user controls to set the scan chain parameters 156. In such a situation, the GUI 160 can also output a graphical representation of the virtual IC chip 108 or some portion thereof, such as an IP block 150.

The scan chain parameters 156 can specify, for example, a set number of EXTEST scan chains, a maximum wirelength and a maximum number of EXTEST wrapper cells per scan chain. Moreover, in some examples, the set number of EXTEST scan chains can be based on the maximum number of EXTEST wrapper cells per scan chain defined in the scan chain parameters 156. In other examples, the set number of EXTEST scan chains can be defined in the scan chain parameters 156 as a predetermined number of EXTEST scan chains. In these examples, the scan chain engine 138 can determine the maximum number of EXTEST wrapper cells per scan chain based on the set number of EXTEST scan chains defined in the scan chain parameters. The set number of EXTEST scan chains can define a total number of EXTEST scan chains that are allowed for each IP block 150. In some examples, each IP block 150 (or some subset thereof) can initially include several hundred scan flip flops for EXTEST scan chains. The scan chain engine 138 can connect EXTEST wrapper cells of such scan flip flops to limit the overall number of EXTEST scan chains to the set number of EXTEST scan chains defined in the scan chain parameters 156. Additionally, the maximum wirelength for the scan chain parameters 156 can define a maximum length of a longest wire in each EXTEST scan chain. It is noted that the total wirelength of each scan chain covering multiple hops between EXTEST wrapper cells can exceed the maximum wirelength, as long as no individual hop (single wirelength) exceeds the maximum wirelength. The maximum number of EXTEST wrapper cells per scan chain defines a maximum number of EXTEST wrapper cells that are allowed for each resultant scan chain once coupled together.

In some examples, the scan chain parameters 156 can be set once and applied to each of the R number of IP blocks 150. In other examples, the scan chain parameters 156 can vary amongst different IP blocks 150. That is, in some examples, the GUI 160 enables user input to set the scan chain parameters 156 on an individual basis for each IP block 150.

The scan chain engine 138 can read the scan chain parameters 156 and modify each of the R number of IP blocks 150 (or some subset thereof) to execute a physically aware scan chain construction process that orders and constructs the EXTEST scan chains in an efficient manner. The scan chain construction process is considered to be "physically aware" scan chain construction process because the physical dimensions and the physical place of components within the R number of IP blocks 150 are consider to construct scan chains. More particularly, during the physically aware scan chain construction process, the scan chain engine 138 executes an iterative partitioning process (e.g., a sub-process, such as quad partitioning or another type of partitioning, such as binary partitioning) based on EXTEST wrapper cell clustering to modify the IP blocks 150 to order and connect EXTEST scan chains based on the scan chain parameters 156. Moreover, responsive to completion of the iterative partitioning process, the scan chain engine 138 can be configured/programmed to execute a wire selection process (e.g., another sub-process) to curtail a number of clock domains crossovers in setting an order of the resultant scan chains.

To demonstrate the operations related to the iterative partitioning process using an iterative quad partitioning process executed by the scan chain engine 138, a first extended example (hereinafter, "first example") is provided. In the first example, it is presumed that the scan chain parameters 156 specify that there are a maximum of five wrapper cells per scan chain, that there is a set number of 10 scan chains, and that there is a maximum length of 2000 units (e.g., nm, μm or pm). FIGS. 4A-4E illustrate how the EXTEST scan chains can be arranged in the IP block 300 of FIG. 3 for the first example. For purposes of simplification of explanation, FIGS. 3 and 4A-4E employ the same reference numbers to denote the same structure.

Figure 4A:
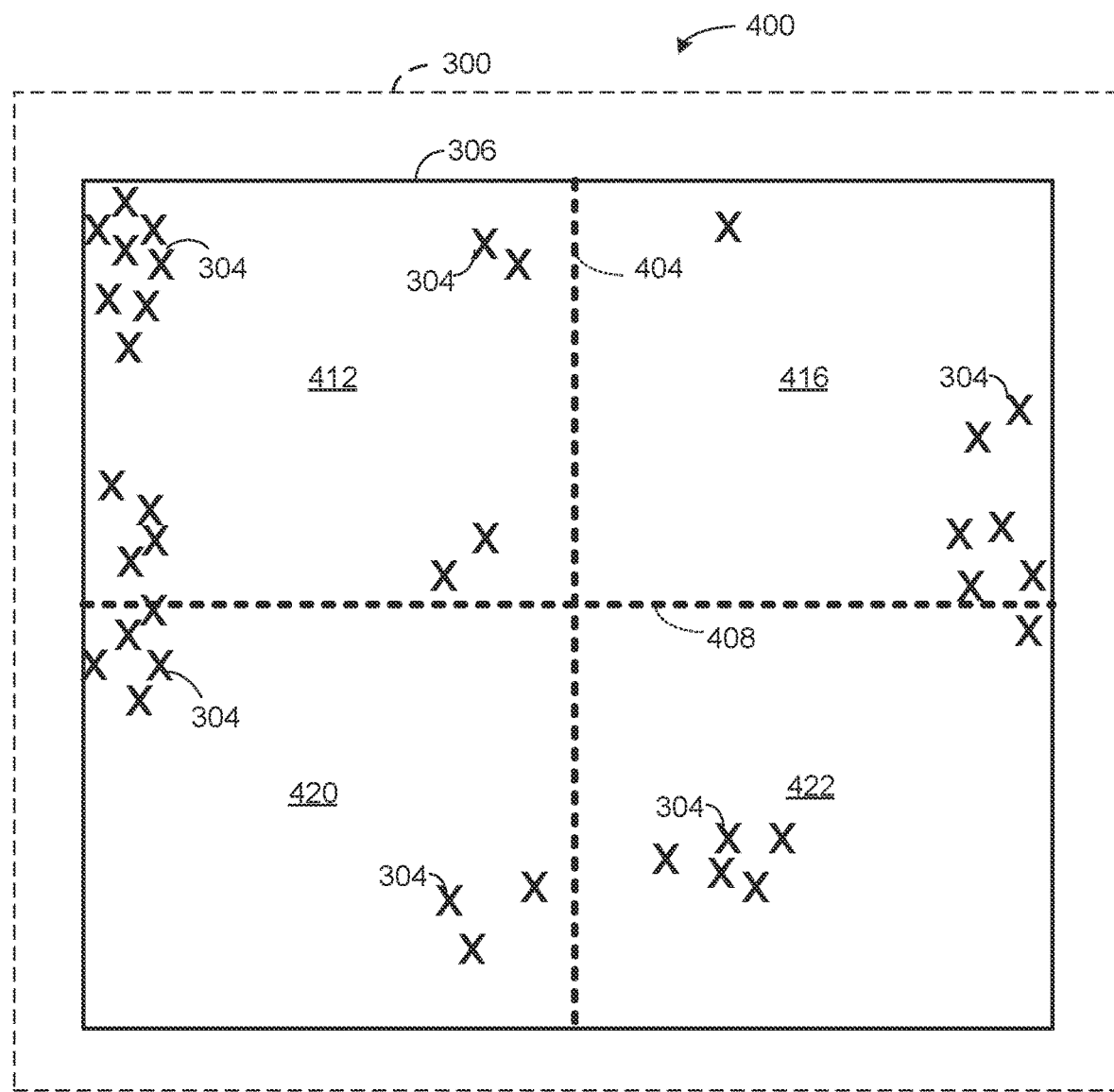
FIG. 4A illustrates an example of an IP block after a first quad partitioning operation.

FIG. 4A illustrates the IP block 300 of FIG. 3 after a first quad partitioning operation 400 of the iterative quad partitioning process executed by a scan chain engine (e.g., the scan chain engine 138 of FIG. 1). The first quad partitioning is denoted with crossing lines 404 and 408 which divides the IP block 300 into quadrant formed of a first partition 412, a second partition 416, a third partition 420 and a fourth partition 422. The crossing lines 404 and 408 extend from one edge of the boundary 306 to an opposing edge of the boundary 306.

The first partition 412 includes sixteen EXTEST wrapper cells 304. The second partition 416 includes seven EXTEST wrapper cells 304. The third partition 420 includes eight EXTEST wrapper cells 304 and the fourth partition 422 includes six EXTEST wrapper cells 304. Each of the first partition 412, the second partition 416, the third partition 420 and the fourth partition 422 include more than the maximum number of EXTEST wrapper cells 304 per scan chain permitted (five) by the scan chain parameters for the first example. Accordingly, the first partition 412, the second partition 416, the third partition 420 and the fourth partition 422 can be partitioned in a second quad partitioning operation.

Figure 4B:
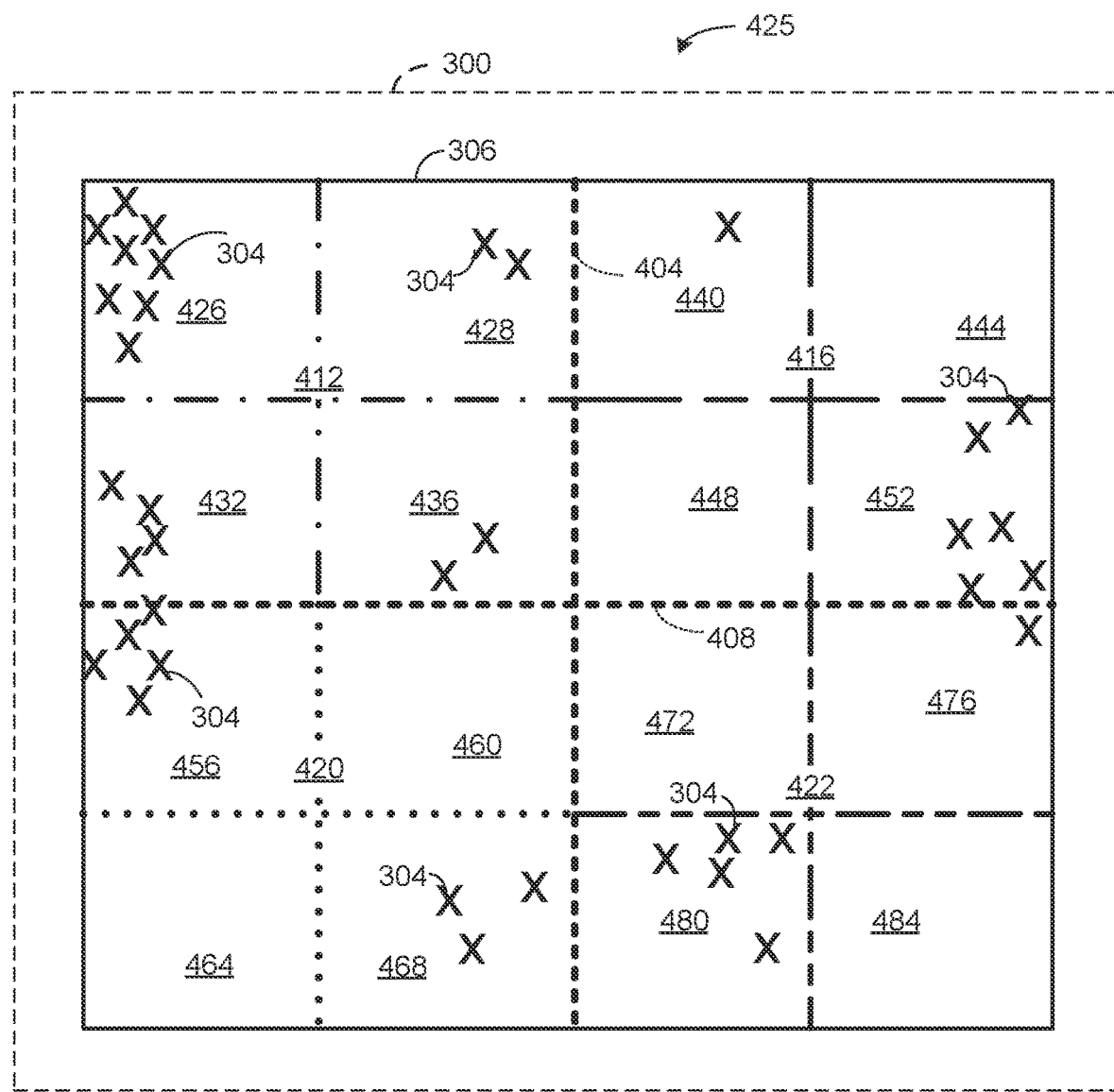
FIG. 4B illustrates an example of an IP block after a second quad partitioning operation.

FIG. 4B illustrates the IP block 300 in the first example after the second quad partitioning operation 425 of the iterative quad portioning process. In the second quad partitioning operation 425, the first partition 412 is subdivided into a first partition 426, a second partition 428 a third partition 432 and a fourth partition 436. Similarly, the second partition 416 is subdivided into four partitions, namely a first partition 440, a second partition 444, a third partition four 448 and a fourth partition 452. The third partition 420 is subdivided into four partitions, namely a first partition 456, a second partition 460, a third partition 464 and a fourth partition 468. Finally, the fourth partition 422 is subdivided into four partitions, namely a first partition 472, a second partition 476, a third partition 480 and a fourth partition 484. After the second quad partitioning operation 425, the partition 426 (of the first partition 412) and the partition 452 (of the second partition 416) each still include more than the maximum number of EXTEST wrapper cells per scan chain (five) permitted in the first example. Thus, the scan chain engine executes a third quad partitioning operation on the partition 426 and the partition 452.

Figure 4C:
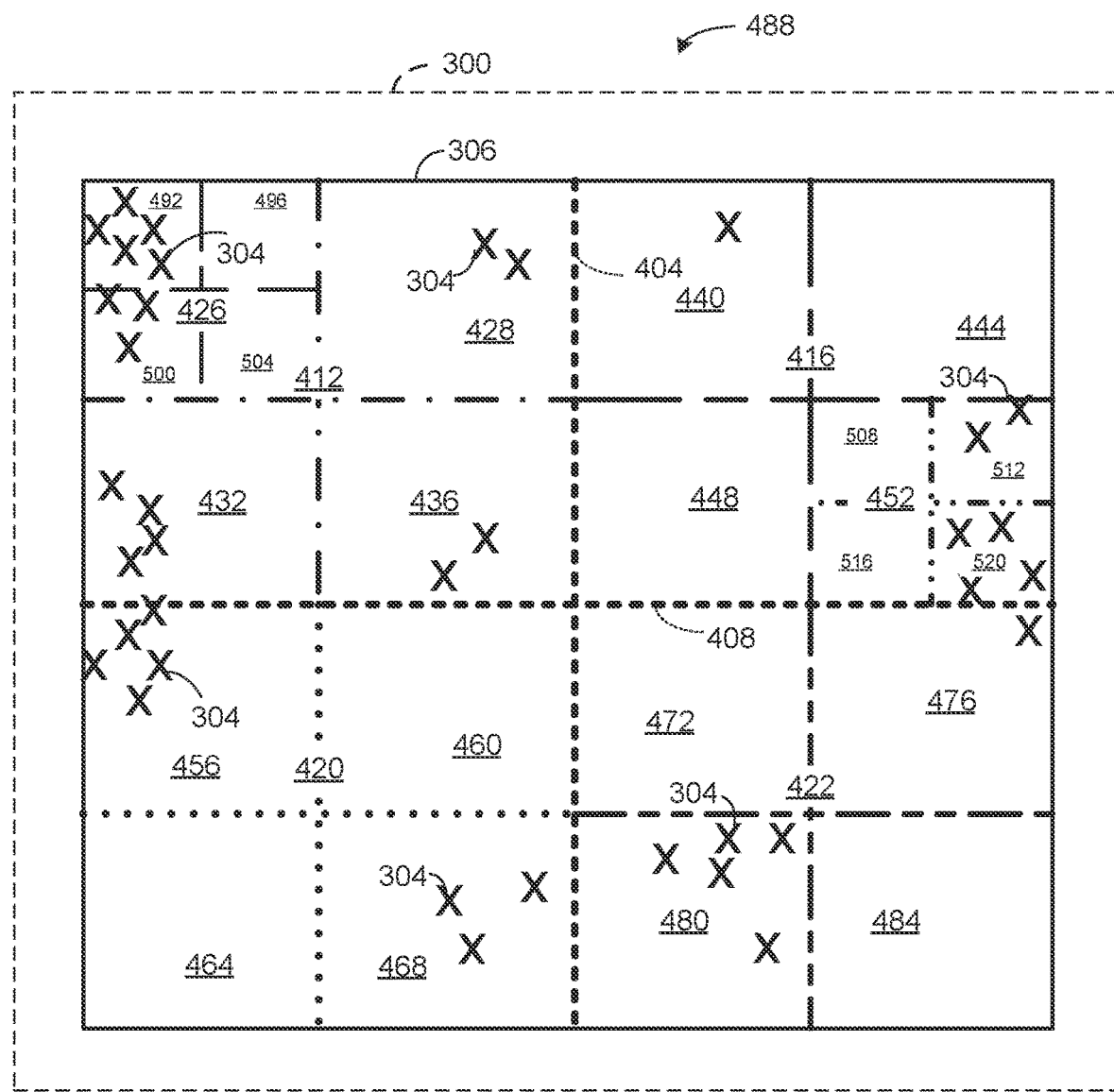
FIG. 4C illustrates an example of an IP block after a third quad partitioning operation.

FIG. 4C illustrates the IP block 300 in the first example after the third quad partitioning operation 488 of the iterative quad portioning process. In the third quad partitioning operation 488, the partition 426 is further subdivided into a first partition 492, a second partition 496, a third partition 500 and a fourth partition 504. Similarly, in the third quad partitioning operation 488, the partition 452 is further subdivided into a first partition 508, a second partition 512, a third partition 516 and a fourth partition 520. Because none of the remaining partitions contain more than the maximum number of EXTEST wrapper cells per scan chain (five) in the first example, further partitioning is not needed.

As illustrated in FIG. 4C, partition 444, partition 460, partition 464 and partition 448 are empty indicating that there are zero EXTEST wrapper cells 304 in each of these partitions. The remaining partitions each have at least one EXTEST wrapper cell 304. As noted, in the first example, the scan chain parameters dictate that there are 10 total scan chains. However, as illustrated by FIG. 4C after the third quad partitioning operation 488, there are twelve partitions that include at least one EXTEST wrapper cell 304. Thus, in the first example the scan chain parameters prevent the scan chain engine from simply assigning one scan chain to each partition.

Figure 4D:
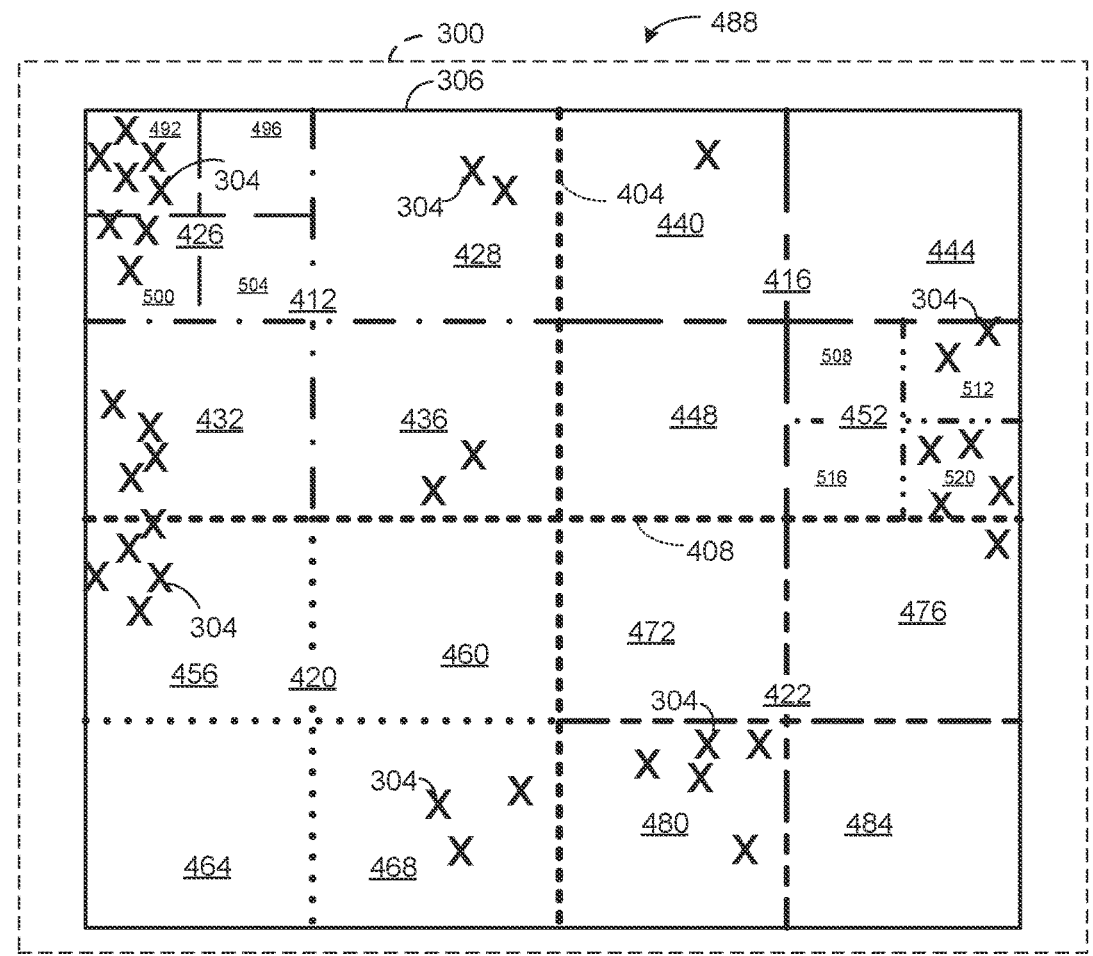
FIG. 4D illustrates an IP block after an iterative quad portioning process, as well as a tree graph that represents a status of each partition in the IP block after the iterative quad portioning process.
Figure 4D:
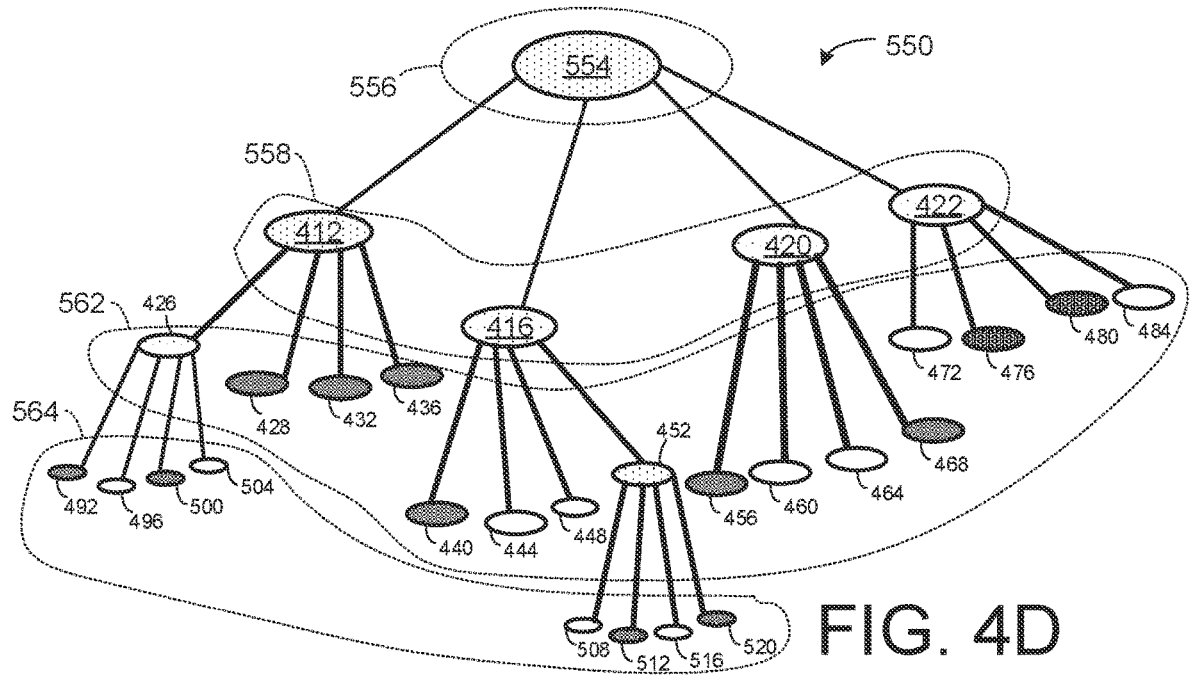

To comply with the scan chain parameters in the first example, the scan chain engine can merge selected partitions in a merge operation. To execute the merge operation, the scan chain engine can generate a tree graph representing the IP block 300 after the third quad partitioning operation 488. FIG. 4D illustrates the IP block 300 after the third quad partitioning operation 488 of the iterative quad partitioning process, as well as a tree graph 550 that represents a status of each partition in the IP block 300 after the third quad partitioning operation 488. In the tree graph 550, each node except for the root node 554 represents a partition with the same reference number.

The root node 554 represents the entire region of the IP block 300 within the boundary 306, and represents a first level 556 of the tree graph 550. Each descendant node of the root node 554 corresponds to a partition after the first quad partitioning operation 400 of FIG. 4A, which nodes form a second level 558 of the tree graph 550. Each node in the second level 558 of the tree graph 550 has four descendant nodes, which form a third level 562 of the tree graph 550. A first subset of nodes in the third level 562 of the tree graph 550 have four descendants the form a fourth level 564 of the tree graph 550. Moreover, in other examples, there could be more or less levels of a resultant tree graph.

In the tree graph 550, leaf nodes (terminating nodes) that are empty (e.g., no pattern) represent partitions with zero EXTEST wrapper cells 304. Moreover, in the tree graph 550, nodes that have at least one descendent are filled with the first pattern, such as the nodes representing partitions 412 and 452. Further still, leaf nodes filled with a second pattern represent nodes with at least one EXTEST wrapper cell 304, such as the nodes representing partitions 492 and 440.

Responsive to forming the tree graph 550, the scan chain engine can analyze the IP block 150 to determine which partitions to merge. More particularly, the scan chain engine can calculate a centroid for each partition of the IP block 150. The centroid of each partition can be, for example a centroid of a location of each EXTEST wrapper cell 304 within a respective partition. That is, the centroid of a respective partition can represent a position of central tendency of the physical location of each wrapper cell 304 within the respective partition. The scan chain engine can be programmed/configured to identify pairs of adjacent partitions represented as leaf nodes that, if merged, the resultant merged partition has less than or equal to the maximum number of EXTEST wrapper cells 304 allowed. Such pairs of adjacent partitions can be referred to as mergeable partitions. The scan chain engine can select a sufficient number of the pairs of mergeable partitions that have the shortest distance between respective centroids to reduce the number of populated partitions to a number that is no greater than the set number of EXTEST scan chains allowed by the scan chain parameters.

In the first example, it is presumed that the scan chain engine selects the partition 476 and the partition 520 for merger. Similarly, in the first example it is presumed that the scan chain engine selects the partition 440 and the partition 428 for merger. Merging partition 476 with partition 520, and merging partition 440 with the partition 428 reduces the total number of partitions populated with EXTEST wrapper cells 304 to ten, which is equal to the set number of EXTEST scan chains allowed for the IP block dictated by the scan chain parameters.

Figure 4E:
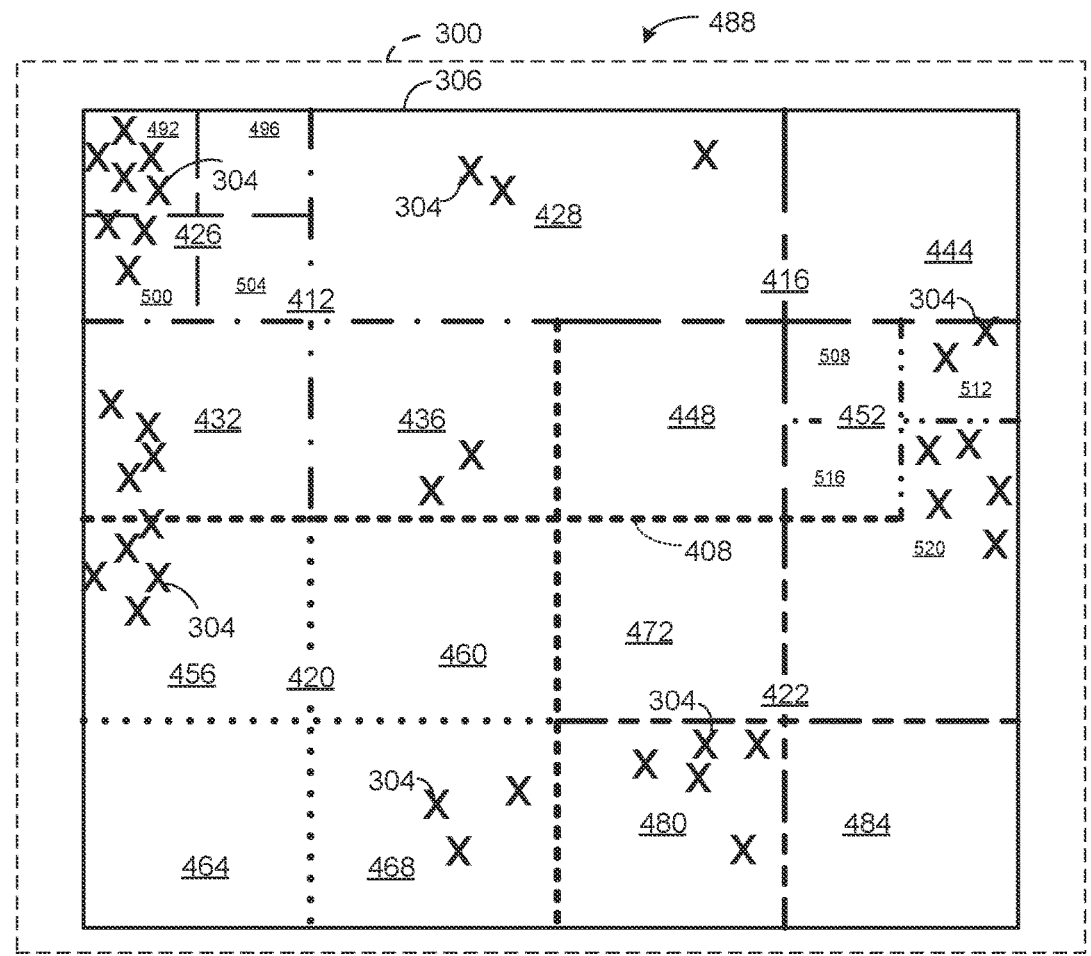
FIG. 4E illustrates an IP block and the tree graph after execution of a merging operation of an iterative quad portioning process.
Figure 4E:
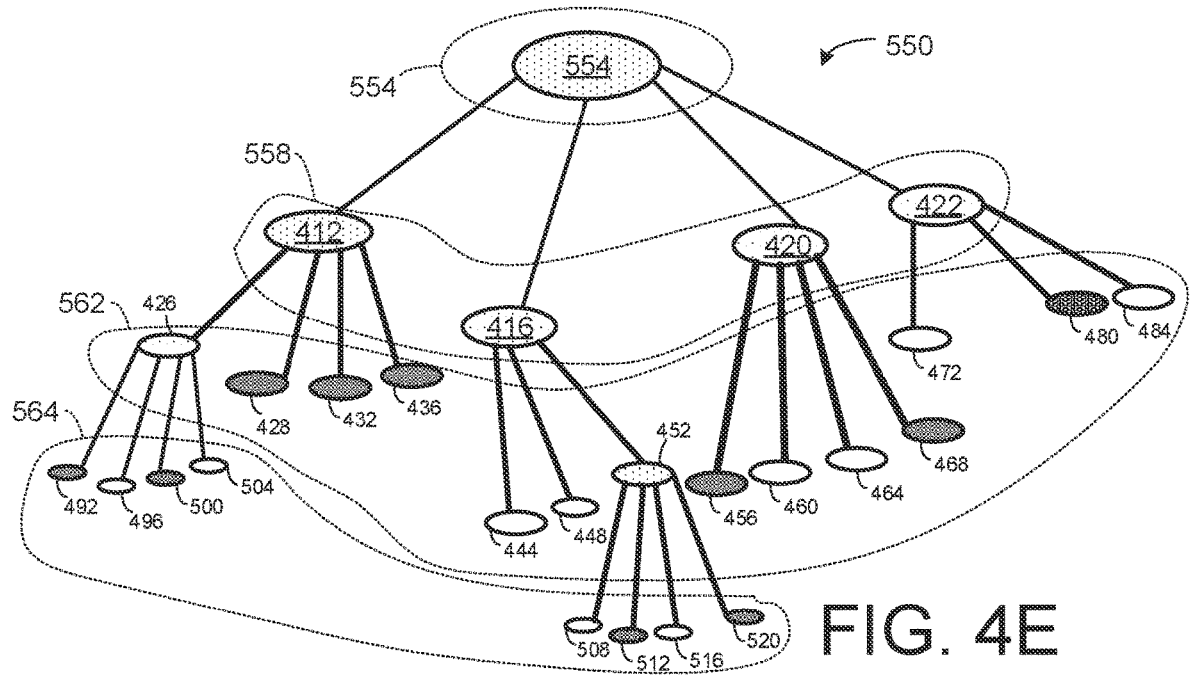

FIG. 4E illustrates the IP block 300 and the tree graph after execution of a merging operation 570 of the iterative quad portioning process. In FIG. 4E, the partitions 440 and 476 have been eliminated. Moreover, the partitions 520 and 428 have been expanded. The merging operation 570 results in ten partitions that are populated with EXTEST wrapper cells 304. Moreover, this is indicated by the graph 550 of FIG. 4E having ten leaf nodes that are filled with the second pattern. Thus, the scan chain engine can select the EXTEST wrapper cells 304 of each remaining populated partition for one corresponding scan chain. For instance, the EXTEST wrapper cells 304 of the partition 500 can be selected for a first scan chain, and EXTEST wrapper cells 304 of the partition 480 can be selected for a second scan chain, etc.

Referring back to FIG. 1, the scan chain engine 138 completes the iterative quad partitioning process (or another iterative partitioning process) by selecting partitions for EXTEST scan chains. In response to completion of the iterative quad partitioning process, the scan chain engine 138 executes a wire selection process. In the wire selection process, the scan chain engine 138 can generate sets of wire paths (multiple wire paths) for each such EXTEST scan chain. The scan chain engine 138 can select the wire path for a respective EXTEST scan chain that has the fewest clock domain crossovers to curtail the total number of clock domain crossings. Upon selecting a wire path for each EXTEST scan chain for each IP block 150 (or some subset thereof), the wire selection process is completed. Thus, the scan chain engine 138 employs the selected wire path to construct the set number of EXTEST scan chains (designated in the scan chain parameters 156 and/or based on the maximum number of EXTEST wrapper cells per EXTEST scan chain provided in the scan chain parameters 156) and the physically aware scan chain construction process is also completed. The GUI 160 can output information characterizing each resultant scan chain for a selected IP block. That information can include, for example, a scan chain identifier (e.g., a numeric identifier), a number of EXTEST cells (a combination of scan flip flops and EXTEST wrapper cells) within a corresponding scan chain and a wirelength (e.g., a total wirelength) of the corresponding scan chain. Furthermore, in some examples, the GUI 160 can output a physical layout of a selected IP block 150 and the resultant scan chains constructed by the scan chain engine 138. Such information can be used, for example, to adjust the scan chain parameters 156 and re-execute the physically aware scan chain construction process.

As an example of the visualization provided by the GUI 160, a second extended example is provided (hereinafter, "the second example"). In the second example, it is presumed that a given IP block has been selected, and the scan chain parameters 156 are initially assign to a set number of EXTEST scan chains of three, a total number of EXTEST of 4148 and a maximum wirelength (for a single hop) of 2000 units. In the second example, it is presumed that upon review of the visualization provided by the GUI 160, that the scan chain parameters are tuned. FIGS. 5A-5E illustrates possible screenshots of the GUI 160 that are provided in response to setting and tuning the scan chain parameters 156. FIGS. 5A-5E employ the same reference numbers to denote the same structure.

Figure 5A:
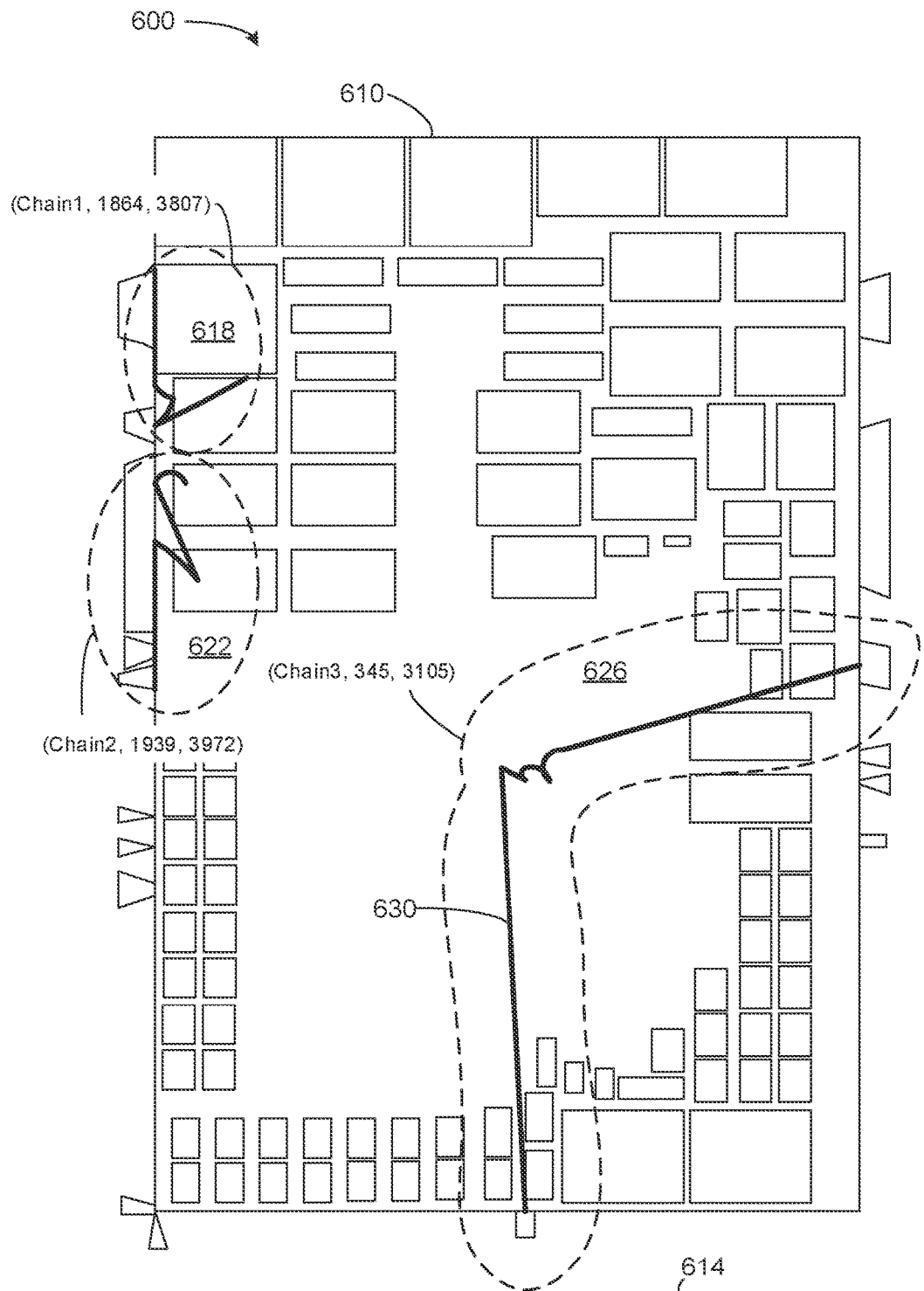
FIG. 5A illustrates a screenshot output by a GUI illustrating constructed scan chains for an IP block using a first set of scan chain parameters.

More particularly, FIG. 5A illustrates an example of a screenshot 600 that can be provided by a GUI (e.g., the GUI 160 of FIG. 1) that includes an IP block 610. The IP block 610 includes sub-blocks that could represent, for example, combinational logic, sequential logic or a combination thereof. Moreover, each sub-block could represent another IP block. In the screenshot 600 of the second example, the initial scan chain parameters are set, which are characterized in a text box 614.

The screenshot 600 includes an indicator of a first scan chain 618, a second scan chain 622 and a third scan chain 626, which is the set number of EXTEST scan chains (three) allowed by the scan chain parameters. Further, the screenshot includes text that characterizes properties of each scan chain in the form of "(name, no. EXTEST cells, wirelength)". That is, the text "(Chain2, 1939, 3972)" identifies the second scan chain 622, and indicates that the second scan chain has 1939 EXTEST cells and a total wirelength of 3972 units.

Visual inspection of the third scan chain 626 reveals an excessively long wire segment 630, although the wire segment 630 has a maximum length that is less than or equal to the maximum wire length specified in the user parameters. In the second example it is presumed that the scan chain parameters (e.g., the scan chain parameters 156 of FIG. 1) are tuned to reduce a length of a longest wire segment (namely, the wire segment 630 in the screenshot 600).

Figure 5B:
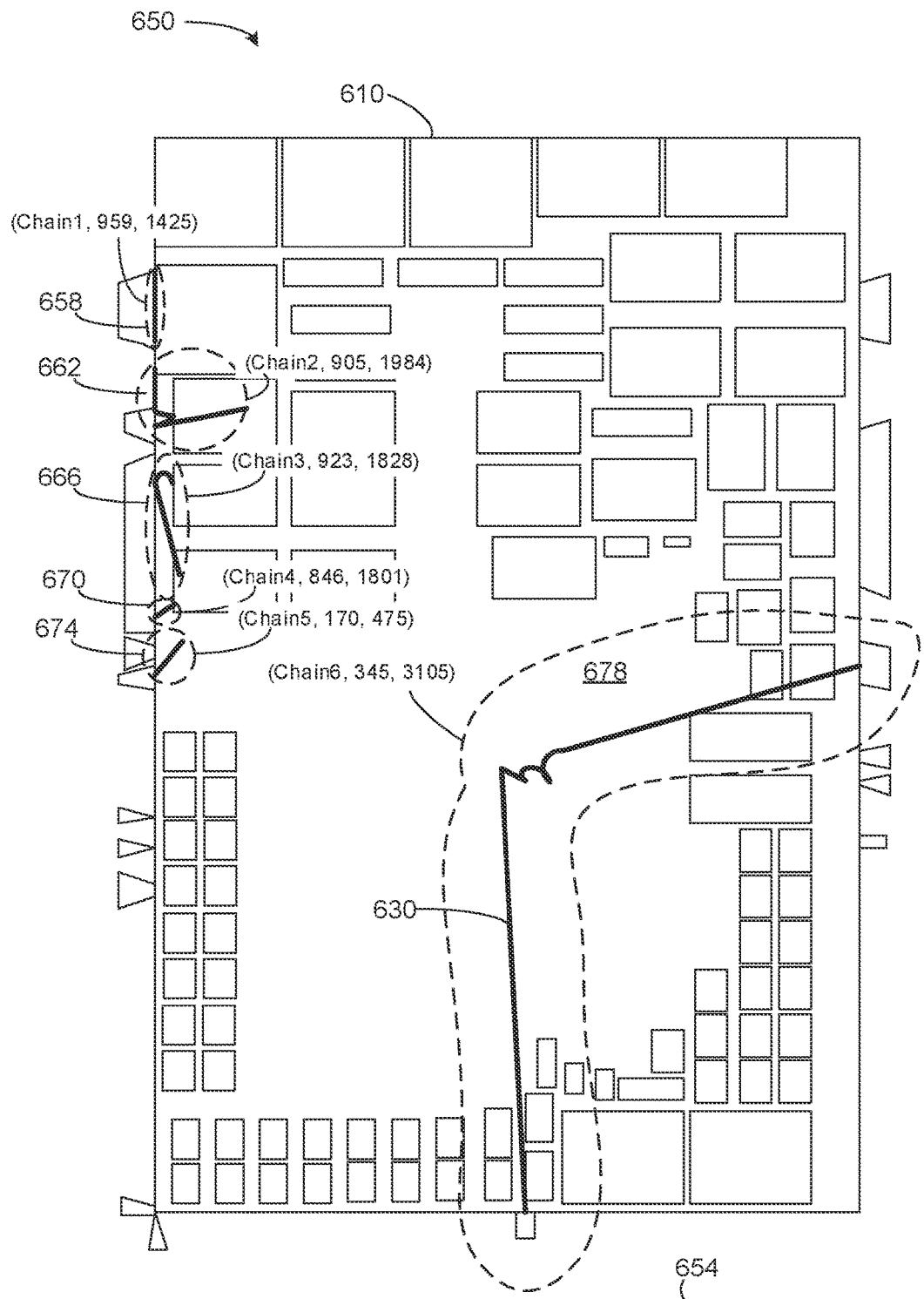
FIG. 5B illustrates a screenshot output by a GUI illustrating constructed scan chains for an IP block using a second set of scan chain parameters.

Further, FIG. 5B illustrates an example of a screenshot 650 that can be provided by the GUI (e.g., the GUI 160 of FIG. 1) that includes the IP block 610. In the screenshot 650 of the second example, the scan chain parameters are updated, which are characterized in a text box 654. As indicated by the text box 654, the scan chain parameters for the screenshot 650 indicate that there is a maximum number of EXTEST wrapper cells in a scan chain of 1000, there is a set number of EXTEST scan chains of six that and that there are 4148 EXTEST wrapper cells.

The screenshot 650 includes an indicator of a first scan chain 658, a second scan chain 662 and a third scan chain 666, a fourth scan chain 670, a fifth scan chain 674 and a sixth scan chain 678, which is the set number of EXTEST scan chains (six) allowed by the scan chain parameters, as indicated in the text box 654. Further, the screenshot 650 also includes text that characterizes properties of each scan chain in the form of "(name, no. EXTEST cells, wirelength)". As illustrated, the sixth scan chain 678 of the screenshot 650 has the same properties as the third scan chain 626 of FIG. 5A. Thus, visual inspection of the sixth scan chain 678 reveals the excessively long wire segment 630 is still present. In the second example it is presumed that the scan chain parameters (e.g., the scan chain parameters 156 of FIG. 1) are further tuned in an attempt to reduce a length of a longest wire segment (namely, the wire segment 630 in the screenshot 650).

Figure 5C:
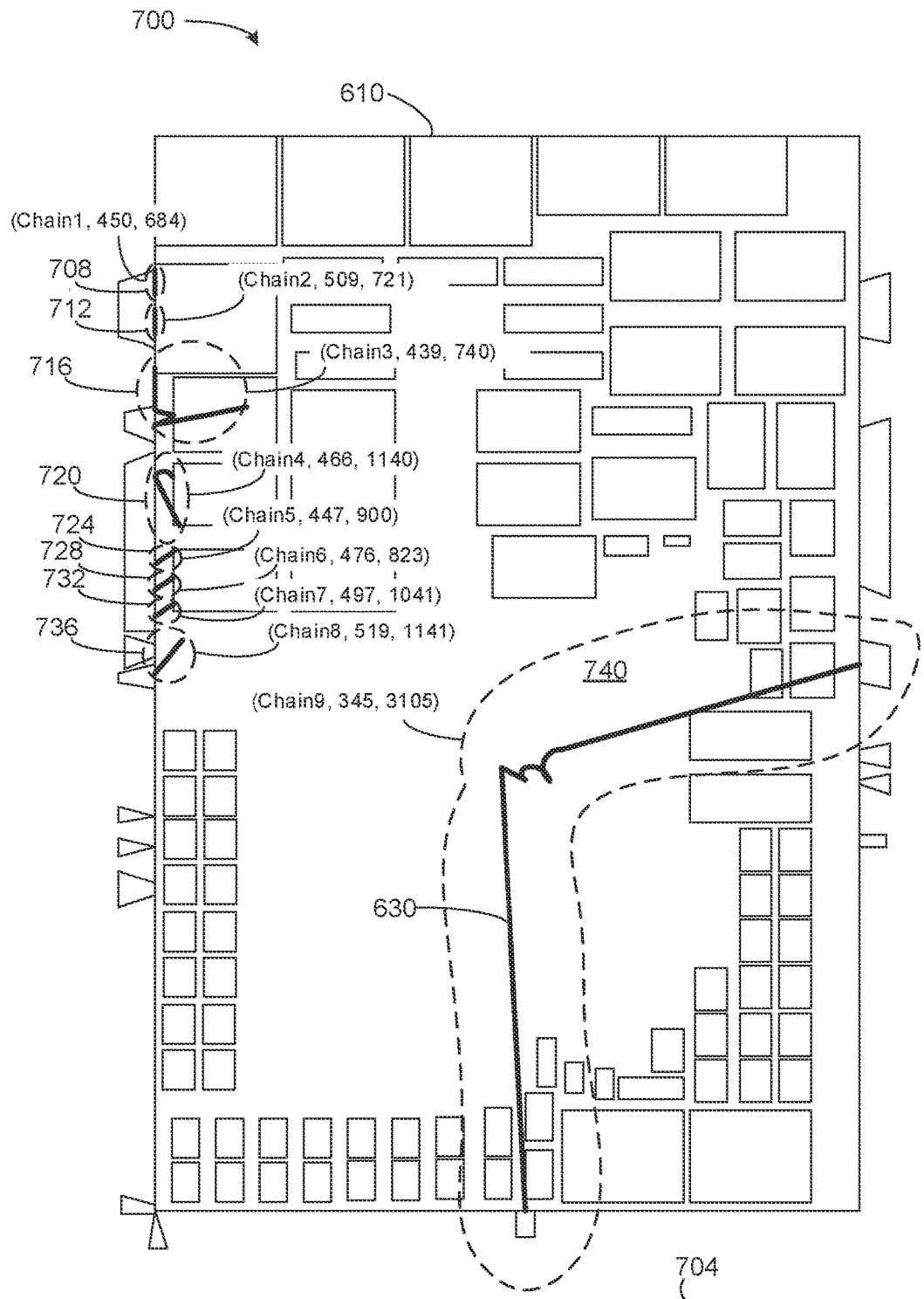
FIG. 5C illustrates a screenshot output by a GUI illustrating constructed scan chains for an IP block using a third set of scan chain parameters.

Further, FIG. 5C illustrates an example of a screenshot 700 that can be provided by the GUI (e.g., the GUI 160 of FIG. 1) that includes the IP block 610. In the screenshot 700 of the second example, the scan chain parameters are further updated, which are characterized in a text box 704. As indicated by the text box 704, the scan chain parameters for the screenshot 700 indicate that there is a maximum number of EXTEST wrapper cells in a scan chain of 700 and that there are 4148 EXTEST wrapper cells.

The screenshot 700 includes an indicator of a first scan chain 708, a second scan chain 712, a third scan chain 716, a fourth scan chain 720, a fifth scan chain 724, a sixth scan chain 728, a seventh scan chain 732, an eight scan chain 736 and a ninth scan chain 740, which is the set number of EXTEST scan chains (nine) allowed by the scan chain parameters, as indicated in the text box 704. Further, the screenshot 700 also includes text that characterizes properties of each scan chain in the form of "(name, no. EXTEST cells, wirelength)". As illustrated, the ninth scan chain 740 of the screenshot 700 has the same properties as the sixth scan chain 678 of FIG. 5B and the third scan chain 626 of FIG. 5A. Thus, visual inspection of the sixth scan chain 678 reveals the excessively long wire segment 630 is still present. In the second example it is presumed that the scan chain parameters (e.g., the scan chain parameters 156 of FIG. 1) are still further tuned in an attempt to reduce a length of a longest wire segment (namely, the wire segment 630 in the screenshot 650).

Figure 5D:
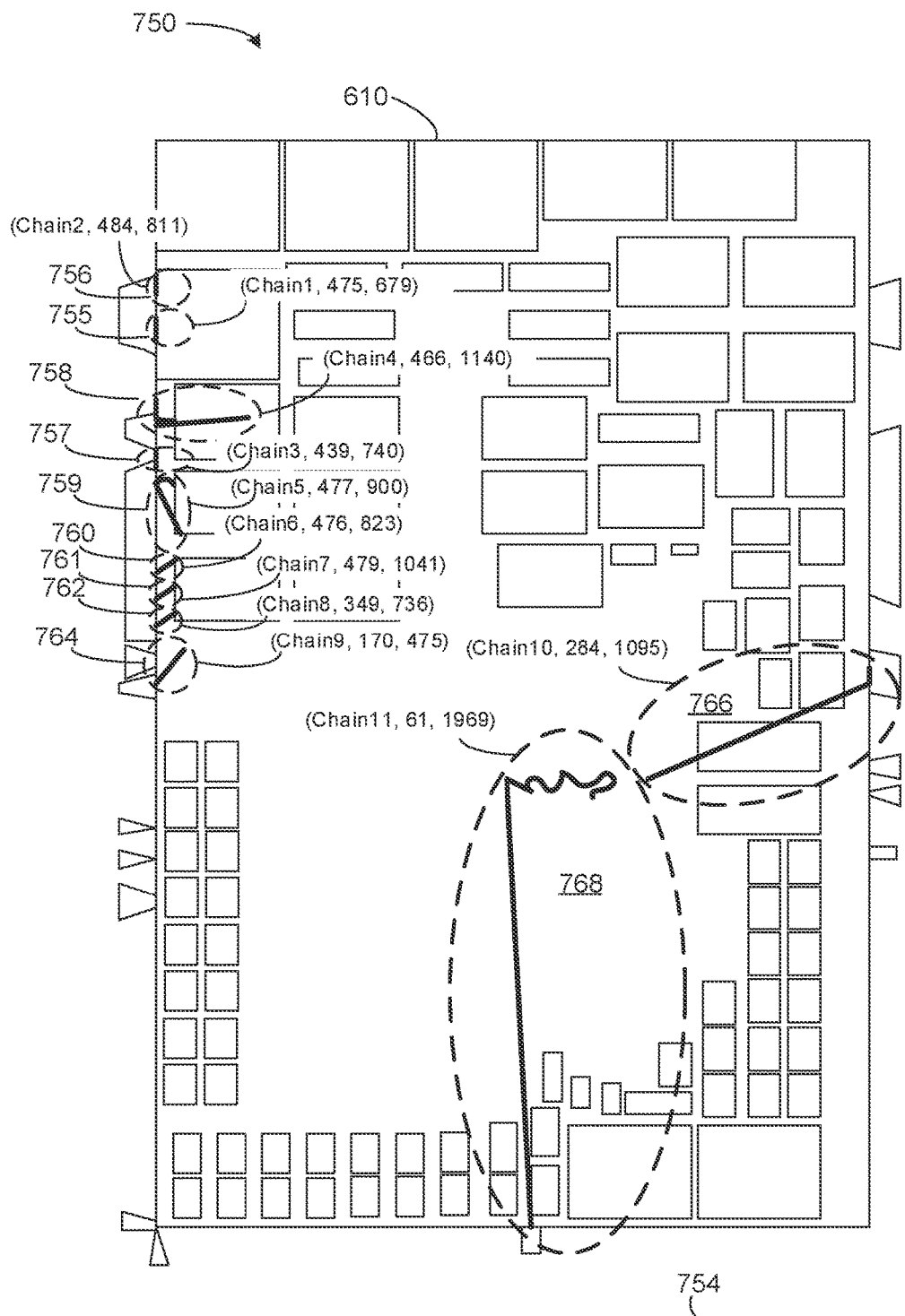
FIG. 5D illustrates a screenshot output by a GUI illustrating constructed scan chains for an IP block using a fourth set of scan chain parameters.

Further, FIG. 5D illustrates an example of a screenshot 750 that can be provided by the GUI (e.g., the GUI 160 of FIG. 1) that includes the IP block 610. In the screenshot 750 of the second example, the scan chain parameters are still further updated, which are characterized in a text box 754. As indicated by the text box 754, the scan chain parameters for the screenshot 750 indicate that there is a maximum number of EXTEST wrapper cells in a scan chain of 500, that there is a set number of EXTEST scan chains of eleven that are employed and that there are 4148 EXTEST wrapper cells.

The screenshot 750 includes an indicator of a first scan chain 755, a second scan chain 756, a third scan chain 757, a fourth scan chain 758, a fifth scan chain 759, a sixth scan chain 760, a seventh scan chain 761, an eight scan chain 762, a ninth scan chain 764, a tenth scan chain 766 and an eleventh scan chain 768, which is the set number of EXTEST scan chains (eleven) allowed by the scan chain parameters, as indicated in the text box 754. Further, the screenshot 750 includes text that characterizes properties of each scan chain in the form of "(name, no. EXTEST cells, wirelength)". As illustrated, the ninth scan chain 740 of the screenshot 700 has been divided into two scan chains, namely, the tenth scan chain 766 and the eleventh scan chain 768. Thus, visual inspection of the tenth scan chain 766 and the eleventh scan chain 768 reveal that excessively long wire segments have been avoided. However, in the second example, it is presumed that the scan chain parameters are further updated in an attempt to further tune the scan chain parameters.

Figure 5E:
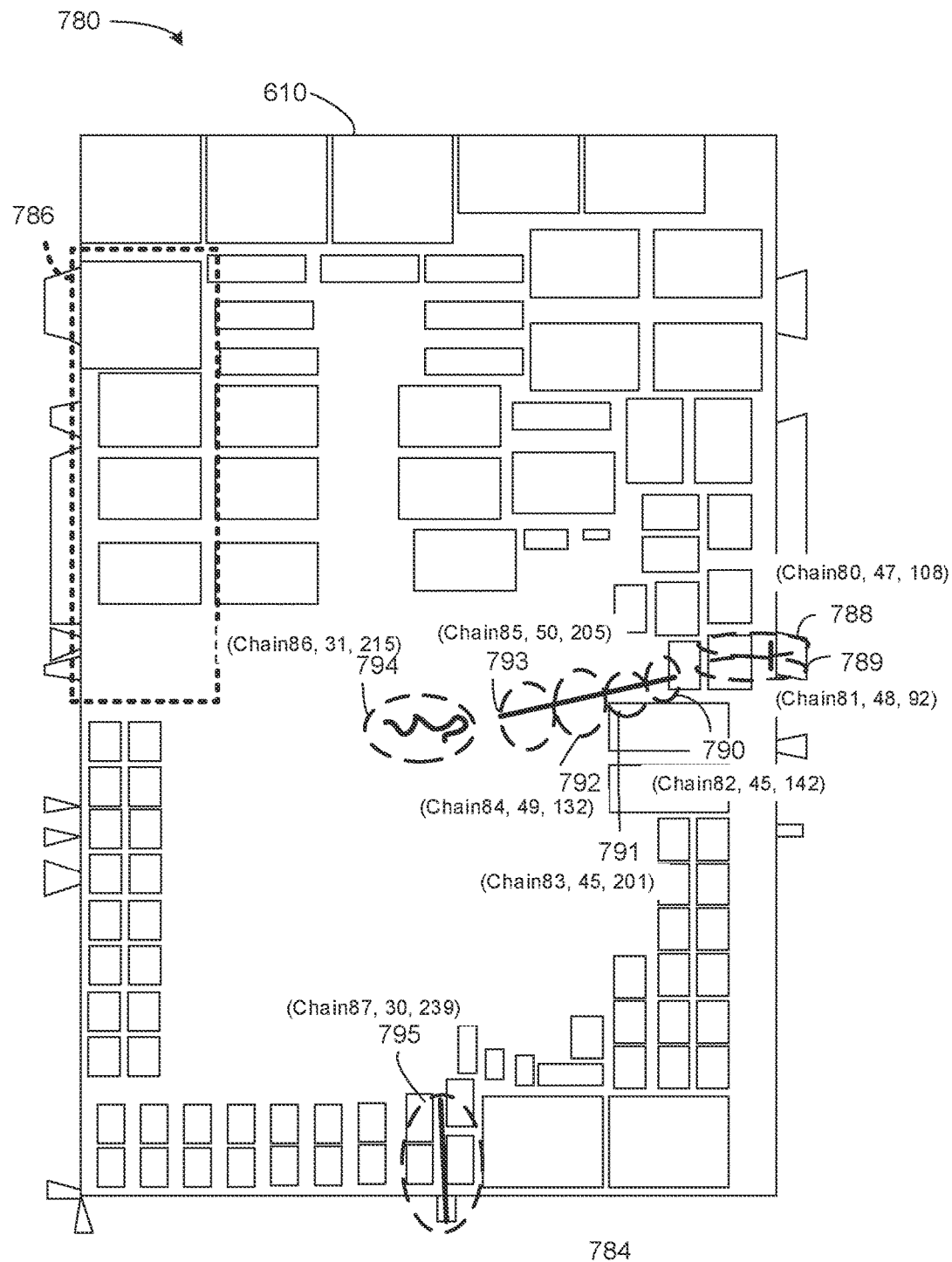
FIG. 5E illustrates a screenshot output by a GUI illustrating constructed scan chains for an IP block using a fifth set of scan chain parameters.

More particularly, FIG. 5E illustrates an example of a screenshot 780 that can be provided by the GUI (e.g., the GUI 160 of FIG. 1) that includes the IP block 610. In the screenshot 780 of the second example, the scan chain parameters are still further updated, which are characterized in a text box 784. As indicated by the text box 784, the scan chain parameters for the screenshot 750 indicate that there is a maximum of 50 EXTEST wrapper cells in a scan chain, there is a set number of EXTEST scan chains of 87 that are employed and that there are 4148 EXTEST wrapper cells.

The screenshot 780 includes a box 786 that defines a region that includes 79 EXTEST scan chains (not marked individually). Additionally, the screenshot 780 includes an indicator of an eightieth scan chain 788, an eighty-first scan chain 789, an eighty-second scan chain 790, an eighty-third scan chain 791, an eighty-fourth scan chain 792, an eighty-fifth scan chain 793, an eighty-sixth scan chain 794 and an eighty-seventh scan chain 795, which is the set number of EXTEST scan chains (87) allowed by the scan chain parameters, as indicated in the text box 784. Further, the screenshot 750 includes text that characterizes properties of scan chains 80-87 in the form of "(name, no. EXTEST cells, wirelength)". Visual inspection of the EXTEST scan chains illustrated in the screenshot 780 reveal that excessively long wire segments have been avoided. More particularly, in the second example, the screenshot 780 reveals that the eighty-sixth scan chain has a wirelength of 239 units. In the second example, it is presumed that the benefit of further reducing the wirelength from the screenshot 750 of FIG. 5D did not outweigh the cost of the extra seventy-seven EXTEST scan chains needed. Thus in the second example, it is presumed that the scan chain parameters (e.g., the scan chain parameters 156 of FIG. 1) are satisfactorily tuned after the scan chain parameters are set to the values characterized in the text box 754 of FIG. 5D. However, in other examples, it may be determined that the scan chain parameters in the text box 784 of FIG. 5E are more satisfactory.

Referring back to FIG. 1, in response to satisfactorily adjusting the scan chain parameters 156 for each IP block 150 (or some subset thereof), the IP blocks 150 can be updated by the scan chain engine 138 to include the constructed EXTEST scan chains (e.g., wires modified, removed and/or added). Additionally, the scan chain engine 138 can update the IC design 104 with the IP blocks 150 with the constructed EXTEST scan chains. Accordingly, the IC design 104 can be employed to fabricate an IC chip. For instance, in some examples, the IP blocks 150 (with constructed EXTEST scan chains) are employable in other IC designs. In other examples, the combination of the R number of IP blocks 150 are employable to fabricate an IC chip.

In the second example, it is presumed that the maximum length of a longest wire is a primary consideration of a designer. In other examples, the scan chain parameters 156 can include addition and/or alternative considerations. For instance, in some examples, the scan chain parameters 156 can specify a maximum number of EXTEST cells (wrapper cells or scan flip flops in an EXTEST scan chain) per EXTEST scan chains, and may not have a set number of EXTEST scan chains specified. In this situation, the scan chain engine 138 operates in concert with the GUI 160 to output examples of EXTEST scan chains with a number of EXTEST cells that do not exceed the number allowed per EXTEST scan chain. Further, in such a situation, the scan chain engine 138 can determine a recommended number of EXTEST scan chains for an IP block 150 that are commensurate with the maximum number of EXTEST cells per EXTEST scan chain specified in the scan chain parameters 156.

By employing the system 100, a designer of IC chips can leverage the scan chain engine 138 to construct efficient EXTEST scan chains for the IC design 104. More particularly, the physically aware scan chain construction process executed by the scan chain engine 138 systematically tunes EXTEST scan chains to meet the scan chain parameters 156. Thus, in some examples, the resultant EXTEST scan chains each have a longest wire that is no longer than a longest wirelength specified in the scan chain parameters 156. Additionally or alternatively, each of the resultant EXTEST scan chains do not exceed a maximum number of scan flip flops allowed by the scan chain parameters. Moreover, the scan chain engine 138 averts avoidable crossings of clock domains in the IC design 104. Accordingly, the resultant EXTEST scan chains constructed by the scan chain engine 138 can be tailored to meet specific needs of the designer of an IC chip.

Figure 6:
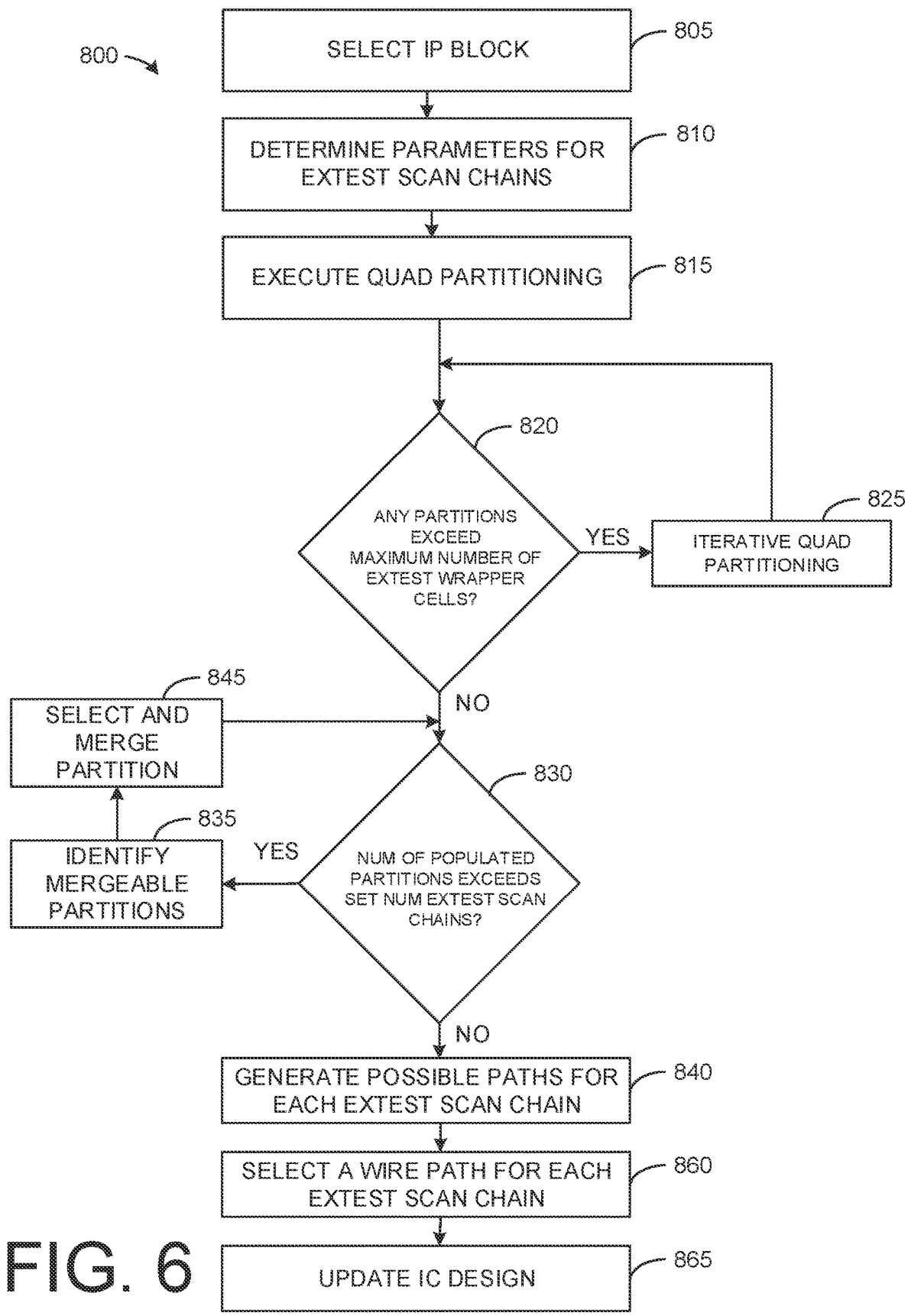
FIG. 6 illustrates a flowchart of an example method for constructing scan chains in an IP block for an IC chip.

In view of the foregoing structural and functional features described above, example methods will be better appreciated with reference to FIG. 6. While, for purposes of simplicity of explanation, the example methods of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates a flowchart of an example method 800 for constructing scan chains in an IP block for an IC design. The method 800 can be implemented by a computing platform executing a scan chain engine, such as the scan chain engine 138 of FIG. 1 operating as a module of an EDA application (e.g., a DFT EDA application) executing on the computing platform 112 of the system 100 of FIG. 1. The IC design can be implemented as the IC design 104 that is employed to instantiate the virtual IC chip 108 of FIG. 1.

At 805, the scan chain engine can select the IP block from a plurality of IP block present in the IC design. At 810, the scan chain engine can determine parameters for the EXTEST scan chains that are to be constructed. The scan chain parameters can include, but are not limited to a set number of scan chains, a maximum number of EXTEST wrapper cells per scan chain, a maximum number of EXTEST cells per scan chain and/or a maximum length of a longest wire per scan chain, etc.

At 815, the scan chain engine can execute a quad partitioning operation on the IP block as part of an iterative quad partitioning process, as illustrated in FIG. 4A. The quad partitioning operation at 815 can divide the IP block into four partitions. The four partitions are added to a set of partitions. At 820, the scan chain engine can make a determination as to whether any partitions in the set of partitions have a number of EXTEST wrapper cells that exceed the maximum number of EXTEST wrapper cells that are allowed by the scan chain parameters. If the determination at 820 is positive (e.g., YES), the method 800 proceed to 825. If the determination at 820 is negative (e.g., NO), the method 800 proceeds to 830. At 825, the scan chain engine executes a next iterative quad portioning that subdivides partitions with EXTEST wrapper cells that exceed the maximum number of EXTEST wrapper cells into smaller quadrant partitions (as illustrated in FIGS. 4B-4C), and these smaller partitions are added to the set of partitions. The method 800 returns to 820. Thus, by executing the operations of 815, 820 and 825, each partition in the set of partitions provided have a number of EXTEST wrapper cells that is less than or equal to the maximum number of EXTEST wrapper cells per scan chain.

At 830, the scan chain engine can make a determination as to whether a number of populated partitions in the set of partitions exceeds the set number of EXTEST scan chains. A populated partition includes one or more EXTEST wrapper cells. If the determination at 830 is positive (e.g., YES), the method 800 proceeds to 835. If the determination at 830 is negative (e.g., NO), the method 800 proceeds to 840. At 835, the scan chain engine identifies pairs of mergeable partitions. Each pair of mergeable partitions has two adjacent populated partitions, wherein the total number of EXTEST wrapper cells (in both partitions in the pair of partitions) is less than or equal to the maximum number of EXTEST wrapper cells per scan chain. At 845, the scan chain engine selects a pair (or multiple pairs) of partitions to merge based on a calculated centroid for each partition in the mergeable pairs of partitions. The centroid of a given partition defines a centroid of a location of EXTEST wrapper cells within the given partition. Moreover, the scan chain engine merges pairs of partitions that have a shortest distance between centroids. The method 800 returns to 830. Thus, by executing the operations 830, 835 and 845, the scan chain engine can provide a set of populated partitions equal to the set number of EXTEST scan chains (defined in the scan chain parameters) and such populated partitions have a number of EXTEST wrapper cells that does not exceed the maximum number of EXTEST wrapper cells permitted by the scan chain parameters.

At 840, the scan chain engine generates multiple wire paths for a scan chain of each populated partition of the set of partitions. At 860, the scan chain engine selects the wire path of the multiple wire paths for each EXTEST scan chain that has a fewest number of clock domain crossings to construct a set of physically aware constructed EXTEST scan chains for the IP block. At 865, the IC design can be updated to include data characterizing a set of physically aware constructed EXTEST scan chains provided for the IP block. In some examples, a visualization of the IP block with the physically aware constructed EXTEST scan chains can be provided through a GUI. In such a situation, upon review, the scan chain parameters may be updated, and the method 800 can be re-executed.

Figure 7:
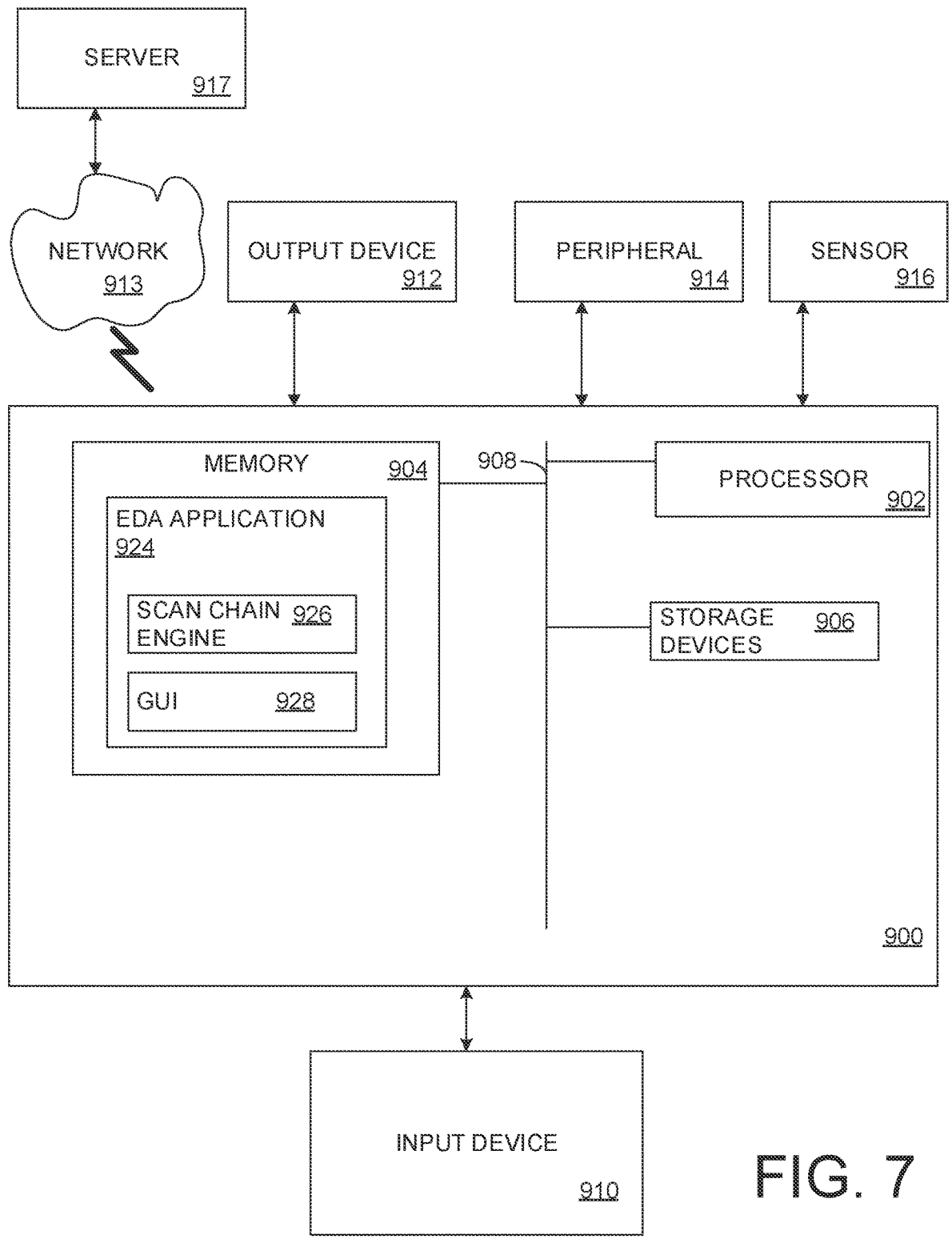
FIG. 7 illustrates an example of a computing system employable to execute a scan chain engine.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 7, the computing system 900 can include a computer processor 902, associated memory 904 (e.g., RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an IC chip for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., LAN, a wide area network (WAN) such as the Internet, a mobile network, or any other type of network) via a network interface connection (not shown). The input device 910 and output device(s) 912 can be connected locally and/or remotely (e.g., via the network 913) to the computer processor 902, the memory 904 and/or the storage devices 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 917 via the network 913.

The memory 904 can include an EDA application 924 (e.g., a DFT EDA application). The EDA application 924 can include a scan chain engine 926 for constructing EXTEST scan chains of an IP block for an IC chip in a manner described herein. Additionally, the EDA application can include a GUI 928 for visualizing the EXTEST scan chains and the IP block, as well as for providing and/or adjusting scan chain parameters.

Further, one or more elements of the aforementioned computing system 900 can be located at a remote location and connected to the other elements over the network 913. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising a scan chain engine that:
   selects an intellectual property (IP) block for an integrated circuit (IC) design;
   determines a set number of EXTEST scan chains for the IP block based on a predetermined maximum number of EXTEST wrapper cells per EXTEST scan chain;
   iteratively executes partitioning on the IP block to generate a set of partitions, wherein each partition in the set of partitions has a number of EXTEST wrapper cells that does not exceed the maximum number of EXTEST wrapper cells per EXTEST scan chain;

selectively merges partitions of the set of partitions to form a set of populated partitions that each include an EXTEST wrapper cell, wherein the number of populated partitions is equal to the set number of EXTEST scan chains for the IP block; and generates wire paths connecting EXTEST wrapper cells of each populated partition of the set of populated partitions to construct the set number of EXTEST scan chains for the IP block.

2. The medium of claim 1, wherein the scan chain engine receives scan chain parameters that specify the set number of EXTEST scan chains for the IP block.

3. The medium of claim 1, wherein the scan chain engine receives scan chain parameters that specify the maximum number of EXTEST wrapper cells per EXTEST scan chain.

4. The medium of claim 1, wherein the scan chain engine receives scan chain parameters that specify a maximum longest wire length for each EXTEST scan chain in the set number of EXTEST scan chains and each wire connecting EXTEST wrapper cells in the set number of EXTEST scan chains does not exceed the maximum longest wire length.

5. The medium of claim 1, wherein the iterative execution of partitioning further comprises:

quad partitioning the IP block to form a set of partitions; and iteratively quad partitioning partitions in the set of partitions that have a number of EXTEST wrapper cells that exceeds the maximum number of EXTEST wrapper cells per EXTEST scan chain until each partition in the set of partitions has a number of EXTEST wrapper cells that is less than or equal to the maximum number of EXTEST wrapper cells per EXTEST scan chain.

6. The medium of claim 1, wherein the generating of wire paths for connecting EXTEST wrapper cells of each populated partition of the set of populated partitions further comprises:

generating multiple wire paths connecting EXTEST wrapper cells of each populated partition; and selecting, for each populated partition, a wire path of the multiple wire paths that has the fewest clock domain crossings.

7. The medium of claim 1, wherein selectively merging partitions comprises:

identifying pairs of partitions that are adjacent and have a combined number of EXTEST wrapper cells that does not exceed the maximum number of EXTEST wrapper cells per EXTEST scan chain;

calculating a centroid of each partition in the pairs of partitions;

selecting a pair of partitions of the pairs of partitions for merger that have a shortest distance between the centroids calculated for each partition; and merging the selected pair of partitions.

8. The medium of claim 7, wherein the machine-readable instructions further comprises a graphical user interface (GUI) that outputs a visual representation of the IP block with the set number of EXTEST scan chains.

9. The medium of claim 8, wherein the GUI provides user controls for setting and/or changing the set number of EXTEST scan chains for the IP block and the maximum number of EXTEST wrapper cells per EXTEST scan chain.

10. The medium of claim 1, wherein the scan chain engine writes data characterizing the set number of EXTEST scan chains to the IC design that includes the IP block.

11. The medium of claim 10, wherein the IP block is selected from a plurality of IP blocks in the IC design.

12. A system comprising:

a non-transitory memory that stores machine-readable instructions; and a processing unit that accesses the memory and executes the machine-readable instructions, the machine-readable instructions comprising an electronic design automation (EDA) application, the EDA application comprising:

a graphical user interface (GUI) that generates scan chain parameters for an IP block in response to user input; and a scan chain engine that:

selects an intellectual property (IP) block for an integrated circuit (IC) design;

selects a set number of EXTEST scan chains for the IP block based on a predetermined maximum number of EXTEST wrapper cells per EXTEST scan chain specified in the scan chain parameters or on a predetermined set number of EXTEST scan chains specified in the scan chain parameters;

iteratively executes partitioning on the IP block to generate a set of partitions, wherein each partition in the set of partitions has a number of EXTEST wrapper cells that does not exceed the maximum number of EXTEST wrapper cells per EXTEST scan chain;

selectively merges partitions of the set of partitions to form a set of populated partitions that each include an EXTEST wrapper cell, wherein the number of populated partitions is equal to the set number of EXTEST scan chains for the IP block; and generates wire paths connecting EXTEST wrapper cells of each populated partition of the set of populated partitions to construct the set number of EXTEST scan chains for the IP block that comply with the scan chain parameters;

wherein the GUI outputs a visual representation of the IP block with the set number of EXTEST scan chains.

13. The system of claim 12, wherein the scan chain engine receives scan chain parameters that specify the set number of EXTEST scan chains for the IP block.

14. The system of claim 12, wherein the scan chain engine receives scan chain parameters that specify the maximum number of EXTEST wrapper cells per EXTEST scan chain.

15. The system of claim 12, wherein the scan chain engine receives scan chain parameters that specify a maximum longest wire length for each EXTEST scan chain in the set number of EXTEST scan chains and each wire connecting EXTEST wrapper cells in the set number of EXTEST scan chains does not exceed the maximum longest wire length.

16. The system of claim 12, wherein the iterative execution of partitioning comprises:

quad partitioning the IP block to form a set of partitions; and iteratively quad partitioning partitions in the set of partitions that have a number of EXTEST wrapper cells that exceeds the maximum number of EXTEST wrapper cells per EXTEST scan chain until each partition in the set of partitions has a number of EXTEST wrapper cells that is less than or equal to the maximum number of EXTEST wrapper cells per EXTEST scan chain.

17. The system of claim 12, wherein generating wires for connecting EXTEST wrapper cells of each populated partition of the set of populated partitions further comprises:
- generating multiple wire paths connecting EXTEST wrapper cells of each populated partition; and
- selecting, for each populated partition, a wire path of the multiple wire paths that has the fewest clock domain crossings.

18. The system of claim 12, wherein selectively merging partitions comprises:
- identifying pairs of partitions that are adjacent and have a combined number of EXTEST wrapper cells that does not exceed the maximum number of EXTEST wrapper cells per EXTEST scan chain;
- calculating a centroid of each partition in the pairs of partitions;
- selecting a pair of partitions of the pairs of partitions for merger that have a shortest distance between the centroids calculated for each partition; and
- merging the selected pair of partitions.

19. A method for constructing physically aware EXTEST scan chains in an intellectual property (IP) block for an integrated circuit (IC) chip, the method comprising:
- determining, by a scan chain engine, a set number of EXTEST scan chains for the IP block based on a predetermined maximum number of EXTEST wrapper cells per EXTEST scan chain;
- iteratively executing, by the scan chain engine, partitioning on the IP block to generate a set of partitions, wherein each partition in the set of partitions has a number of EXTEST wrapper cells that does not exceed the given maximum number of EXTEST wrapper cells per EXTEST scan chain;
- selectively merging, by the scan chain engine, partitions of the set of partitions to form a set of populated partitions that each include an EXTEST wrapper cell, wherein the number of populated partitions is equal to the set number of EXTEST scan chains for the IP block; and
- generating, by the scan chain engine, wire paths connecting EXTEST wrapper cells of each populated partition of the set of populated partitions to construct the set number of EXTEST scan chains for the IP block.

20. The method of claim 19, wherein iteratively executing partitioning further comprises:
- quad partitioning the IP block to form a set of partitions; and
- iteratively quad partitioning partitions in the set of partitions that have a number of EXTEST wrapper cells that exceeds the maximum number of EXTEST wrapper cells per EXTEST scan chain until each partition in the set of partitions has a number of EXTEST wrapper cells that is less than or equal to the maximum number of EXTEST wrapper cells per EXTEST scan chain.

* * * * *